United States Patent
Meiresonne

(10) Patent No.: US 10,339,578 B1
(45) Date of Patent: *Jul. 2, 2019

(54) METHOD AND SYSTEM TO ESTABLISH A COMMUNICATIVE CONNECTION BETWEEN A SUPPLIER AND A CONSUMER OVER THE INTERNET

(71) Applicant: Michael Meiresonne, Grand Rapids, MI (US)

(72) Inventor: Michael Meiresonne, Grand Rapids, MI (US)

(*) Notice: Subject to any disclaimer, the term of this patent is extended or adjusted under 35 U.S.C. 154(b) by 1188 days.

This patent is subject to a terminal disclaimer.

(21) Appl. No.: 14/023,877

(22) Filed: Sep. 11, 2013

Related U.S. Application Data

(63) Continuation of application No. 11/731,992, filed on Apr. 2, 2007, now Pat. No. 8,538,822.

(60) Provisional application No. 60/787,848, filed on Mar. 31, 2006.

(51) Int. Cl.
   *G06Q 30/00* (2012.01)
   *G06Q 30/06* (2012.01)

(52) U.S. Cl.
   CPC ..... *G06Q 30/0611* (2013.01); *G06Q 30/0635* (2013.01)

(58) Field of Classification Search
   CPC .......................................... G06Q 30/06–30/08
   USPC ............................................... 705/26.1–27.2
   See application file for complete search history.

(56) References Cited

U.S. PATENT DOCUMENTS

| | | |
|---|---|---|
| 5,740,425 A | 4/1998 | Povilus |
| 6,058,376 A | 5/2000 | Crockett |
| 6,567,800 B1 | 5/2003 | Barrera et al. |
| 6,643,641 B1 | 11/2003 | Synder |
| 6,662,192 B1 | 12/2003 | Rebane |
| 7,065,520 B2 | 6/2006 | Langford |
| 7,483,872 B2 | 1/2009 | Meiresonne |
| 7,559,034 B1 | 7/2009 | Papemy et al. |
| 2001/0051905 A1 | 12/2001 | Lucas |
| 2002/0032677 A1 | 3/2002 | Morgenthaler et al. |
| 2002/0075299 A1 | 6/2002 | Tobin et al. |
| 2002/0087509 A1 | 7/2002 | Meiresonne |
| 2002/0152222 A1 | 10/2002 | Holbrook |
| 2002/0194151 A1 | 12/2002 | Fenton et al. |
| 2002/0194601 A1 | 12/2002 | Perkes et al. |
| 2003/0001903 A1 | 1/2003 | Duffy |
| 2003/0004837 A1 | 1/2003 | Myers et al. |
| 2003/0023641 A1 | 1/2003 | Gorman et al. |
| 2003/0200205 A1* | 10/2003 | Meiresonne ........ G06F 17/3089 |

(Continued)

OTHER PUBLICATIONS

Superpages.com, May 30, 2007, pp. 1-2 and 1-5.

(Continued)

*Primary Examiner* — Ethan D Civan
(74) *Attorney, Agent, or Firm* — Brooks Kushman P.C.

(57) ABSTRACT

A method for a user to initiate communication with a plurality of suppliers over a network of computers comprising the steps of: providing a supplier communication initiating Web site where the user initiates communication with more than one of a plurality of user selected suppliers of a good or service wherein the supplier communication initiating Web site comprises a supplier selector portion and an information input portion and wherein the information input portion contains information requesting fields requesting information about the user.

20 Claims, 43 Drawing Sheets

(56) References Cited

U.S. PATENT DOCUMENTS

| | | |
|---|---|---|
| 2004/0044600 A1 | 3/2004 | Chu et al. |
| 2004/0073536 A1 | 4/2004 | Leishman et al. |
| 2006/0149721 A1 | 7/2006 | Langford |
| 2009/0106240 A1 | 4/2009 | Meiresonne |

OTHER PUBLICATIONS www.archive.org version of the www.contractpackage.com web site dated Sep. 14, 2000, and related linked pages.
www.archive.org version of the www.contractpackage.com web site dated Jan. 24, 2001, and related linked pages.
www.archive.org version of the www.contractpackage.com web site dated Feb. 1, 2001, and related linked pages.
www.archive.org version of the www.contractpackage.com web site dated Feb. 7, 2001, and related linked pages.
www.archive.org version of the www.contractpackage.com web site dated Mar. 2, 2001, and related linked pages.
www.archive.org version of the www.contractpackage.com web site dated Apr. 5, 2001, and related linked pages.
www.archive.org version of the www.contractpackage.com web site dated May 16, 2001, and related linked pages.
www.archive.org version of the www.contractpackage.com web site dated May 17, 2001, and related linked pages.
www.archive.org version of the www.contractpackage.com web site dated May 18, 2001, and related linked pages.
www.archive.org version of the www.contractpackage.com web site dated May 19, 2001, and related linked pages.
www.archive.org version of the www.contractpackage.com web site dated May 25, 2001, and related linked pages.
www.archive.org version of the www.contractpackage.com web site dated Jul. 21, 2001, and related linked pages.
BPAI Decision on Appeal of U.S. Appl. No. 09/938,163, filed Nov. 28, 2011.
http://web.archive.org/web/19981212034238/http://www.yahoo.com/ (Web page archived Dec. 12, 1998).
http://web.archive.org/web/19981212021045/http://shopguide.yahoo.com/ (Web page archived Dec. 12, 1998).
http://web.archive.org/web/19981212012608/http://apparel.shopping.yahoo.com/ (Web page archived Dec. 12, 1998).
http://web.archive.org/web/19981207013011http://apparel.shopping.yahoo.com/ Apparel/Men_s_and_Boys_Pants/ (Webpage archived Dec. 7, 1998).
http://web.archive.org/web/19981202083627fw_/http://www.llbean.com/bin/homepage.
http://web.archive.org/web/19981212023239/http:/ /www.bizrate.com/.
http://web.archive.org/web/19980421074244/http://www.bizrate.com/display.pl?t=cat&b=cat_apparel.
http://web.archive.org/web/19980421 075357 /http://www.bizrate.com/search.pl?cat=Apparel%20:%20Accessories.
Thangavelu, P., "Net Firm Raises $50 Million"(National Mortage News, vol. 24, No. 1, p. 1, Sep. 27, 1999).
www.industrialquicksearch.com (Mar. 21, 2005; selected pages).

* cited by examiner www.aircompressors.bz
Air Compressors. Air Compressor Manufacturers. Air Compressor
Suppliers. IQS Directory is a comprehensive list of air compressors,
air compressor manufacturers, and air compressor suppliers.

vacuum-pumps
industrial-blowers
Industrial-dryers

92 — Step One:
Choose the companies to send an RFQ to from the list below.

Select Company Name

[ Check All ]

96 — 
- [X] Air Technologies®
- [ ] Coast Compressor Company
- [ ] Central Air Compressor
- [ ] Flow Solutions, Inc.
- [ ] Lubs Technologies, Inc.
- [ ] Scales Industrial Technologies, Inc.

94 — Step Two:
Enter your contact info: *Indicates required field

Company Name:* Company Name is Required
[                    ]

Contact Name:* Contact is Required
[                    ]

Contact Phone:
[                    ]

Contact Email:* E-Mail is Required Valid E-Mail Required
[                    ]

City, State or Country:* City, State or Country is Required
[                    ]

98 — [X] I would like these companies to contact me about sending an attachment. — 99

Step Three:
What specifications and questions do you have for the manufacturers?
[                    ]

[ Send ]  [ Reset ]

90

Back To Featured Companies:

Advertise Your Company    E-mail Sales    Terms and Conditions    Industrial Quick Search, Inc.

FIG. 11 www.aircompressors.bz ——14
Air Compressors. Air Compressor Manufacturers. Air Compressor Suppliers. IQS Directory is a comprehensive ——16
list of air compressors, air compressor manufacturers, and air compressor suppliers.

vacuum-pumps
industrial-blowers
industrial-dryers

Air Technologies® ——18
Columbus, OH
614-342-6247
Request for Quote

Coast Compressor Company
Huntington Beach, CA
714-847-9560
Request for Quote

Central Air Compressor
Warren, MI
877-523-7277
Request for Quote

We are a market leader with creative innovations and exclusive solutions for portable air compressors, screw compressors, air compressors and oil-free compressors. We also offer service and repair, system design, specification analysis and installation for all of your compressed air needs.

Our specialty Powerex Air Compressors, Kaeser Compressors, Ultrafilter-Donaldson Filtration, Reciprocating, Rotary Screw Compressors, Oilless Air Compressors, Medical Compressors, Breathing Air, Vacuum Systems & Dryers. Aftermarket compressor repair parts, distributor, sales, service, in California.

Central Air Compressor is an air compressor distributor for such brands as Bauer Compressors, Champion, Curtis, Powerex, Emglo, Saylor-Beall and CompAir. Products offered include rotary screw compressors, rotary vane, gas and electric air compressors, portable air compressors, oilless and more!

Central Air Compressor
CAC
877-523-7277

10

Additional powder-metal-parts Listings - Page 2    Powder Metal Parts Informational Page Search for Company by Region    Patent Pending    Terms and Conditions    Industrial Quick Search, Inc.

Advertise Your Company  E-mail Sales

FIG. 12

Industrial Quick Search®

IQS Search | Insert Search Here | Search Button

Testimonials

IQS™ Advantages                Client Resources
IQS™ VS TR!                    List Your Company
The IQS® Advantage             Advertising Info
How Does IQS Work              IQS® Client Stats Login

| | | |
|---|---|---|
| Air Compressors | Electronic Connectors | Industrial Ovens | Plastic Tubing |
| Air Cylinders | Electronic Enclosures | Industrial Parts Washers | Pneumatic Conveyors |
| Air Filters | EMI Shielding | Industrial Scales | Powder Metal Parts |
| Air Pollution Control | Environmental Test Chambers | Industrial Shredders | Power Supplies |
| Alloy Suppliers | Extruded Plastics | Industrial Vacuum Cleaners | Pressure Gauges |
| Aluminum Anodizing | Extruded Rubber | Infrared Heaters | Pressure Switches |
| Aluminum Extrusions | Fiberglass Fabrication | Injection Molded Plastics | Pressure Transducers |
| Aluminum Suppliers | Filtration Systems | Investment Castings | Pressure Vessels |
| Assembly Machinery | Flexible Shaft Couplings | Labeling Machinery | Pulverizers |
| Automatic Guided Vehicles | Floor Gratings | Laser Cutting | Quick Disconnect Couplings |
| Ball Bearings | Flow Meters | Latches | Roll Forming |
| Ball Screws | Foam Fabricating | Leak Detectors | Rope Suppliers |
| Ball Valves | Forgings | Linear Actuators | Rotational Molding |
| Blow Molded Plastic | Fork Lift Trucks | Linear Bearings | Rubber Molding |
| Broaching Job Shops | Fractional Horsepower Motors | Linear Slides | Rubber Rolls |
| Butterfly Valves | Friction Materials | Liquid Chillers | Rubber To Metal Bonding |
| Calibration Services | Gaskets | Liquid Filters | Sandblast Equipment |
| Car Wash Equipment | Glass Fabricators | Load Cells | Screw Conveyors |
| Centrifugal Pumps | Grey Iron Castings | Lubrication Equipment | Screw Machine Products |
| Centrifuges | Heat Exchangers | Machine Guards | Sewing Contractors |
| Ceramics | Heat Treating | Machined Graphite | Sheet Metal Fabrication |
| Check Valves | Heating Elements | Machinery Rebuilders | Solenoid Valves |
| Clean Rooms | Hinges | Machine Vision Systems | Sound Proofing |

IQS® Sites by URL

List Your Company    E-mail Sales    IQS® Directory    Terms and Conditions    Industrial Quick Search®

FIG. 13

Client Stats Login

Enter your Username and password to view your IQS™ created Hitslink Account.

Username: ☐

Password: ☐

Login Button

IQM Sites Statistics

FIG. 14

Industrial Quick Search

Statistics for:

aircompressors.bz

| Month | User Sessions |
|---|---|
| September 2006 | 12304 |
| August 2006 | 12900 |
| July 2006 | 12805 |
| Total | 38009 |

List Your Company    E-mail Sales    Terms and Conditions    Industrial Quick Search™

FIG. 16 www.powderedmetalparts.com
Powder Metal Parts. Powder Metal Parts Manufacturers. IQS Directory has the largest selection of powder metal parts and company information for powder metal parts manufacturers.

die-castings
metal-stampings
cold-headed-parts
forgings
screw-machine-products

Webster-Hoff Corporation

Specialists in the Design and Manufacture of Precision Powdered Metal Parts

Quality Powder Metal Manufacturing:

ASCO Sintering
Commerce, CA
323-725-3550
Request for Quote

ASCO Sintering has been a leader in the manufacture of small powdered metal parts, powdered metal gears and sintered metal parts for many years. Serving several Fortune 500 companies in the automotive, electronics and hardware industries. We are an employee-owned company!

Saint Marys Pressed
Metal, Inc.
Ridgway, PA
814-772-7455
Request for Quote

Saint Marys Pressed Metal is a manufacturer of powdered metal parts using ferrous and nonferrous components. Bearings, gears and sprockets are not the only products SMPM manufactures. Our in-house metallurgical lab tests the raw powder we receive. Contact us for your powdered metal parts.

Webster-Hoff
Corporation
Glendale Heights, IL
630-858-8030
Request for Quote

Using strong stainless or high-magnetic-response aluminum, brass, bronze, copper, exotic alloy or iron, Webster-Hoff manufactures powder metal parts. We also have secondary operations—CNC machining, drilling, grinding, heat treating, tapping, tumbling, ultrasonic cleaning and vacuum oiling.

Additional powder-metal-parts Listings - Page 2    Powder Metal Parts Informational Page Search for Company by Region    Patent Pending    Terms and Conditions Advertise Your Company E-mail Sales                                    Industrial Quick Search, Inc.

FIG. 17 powderedmetalparts.com
A powder metal parts and powdered metal parts manufacturers directory including powdered metal, powder metal, sintered parts, sintered metal, powder metal product, powdered metal manufacturer, sintered metal parts, powdered metal gears, powdered metal bushings, and sintered metal products.

coldheadedparts.com
die-castings.net
screw-machine-products.com
metalstamper.net Information Page Links:

Featured Powdered Metal Parts Manufacturers

About Powdered Metal Parts

Powder Metal Parts Terms

Powdered Metal Parts Associations

Powder Metal Parts Resources

Trade Shows

Featured Powder Metal Parts Articles

More Articles

Back

About Powdered Metal Parts

Powder metal parts are created through powder metallurgy (P/M). During this manufacturing process, solid ferrous and nonferrous metal parts are created from metal powder. P/M is suitable for numerous metals, including iron, low alloy steels, stainless steel, nickel, copper, brass and silver. Metals are first reduced to individual particles through methods including atomization, chemical precipitation, comminution and hydrogen reduction. The resulting powders are impregnated with lubricant. Then, they are compacted in a die cavity at ambient temperature, after which they are in a near net state, or "green state." Finally, the green parts are sintered in a furnace at temperatures below the melting point of the metal to bond the particles without changing the shape of the part. The sintering process also increases part strength and controls the porosity of the part. Although the finished parts look solid, they actually consist of small interconnected capillaries, which cause the parts to be approximately 25% porous. Secondary operations are not usually required, but parts may still need to be sized, deburred, heat or steam treated, machined, plated or oil/plastic resin impregnated.

Sintered metal products have many benefits over parts produced through other methods. The process results in little waste, as approximately 97% of the materials are used during the procedures. Sintered products are not shape sensitive, either. The powder metal process produces parts close to tolerances, often eliminating the need for secondary operations. Therefore, P/M is often the technique of choice for the production of intricate parts requiring bends, projections and depressions. A wide variety of shapes and designs can be sintered out of an almost infinite choice of alloys, composites and associated properties. Powder metal parts have controlled porosity for self-lubrication and for gas or liquid filtration.

Powder metal manufacturers provide equipment components for almost every industry. Powdered, or sintered, metal parts are utilized in a variety of industrial applications in the automotive, hardware,

FIG. 18a electronic, computer and lawn and garden industries. Powdered metal parts are found in automobile components, structural parts, filtration systems and magnetic assemblies. Gears are particularly well-suited to the sintering process, as the inherent porosity of powder metal parts naturally dampens sound. Bushings and bearing are also simple to produce through this process, though their tight tolerances usually require a secondary sizing operation. P/M is a popular choice for parts with magnetic properties, as the soft magnetic material is usually difficult to form, limiting the choice of shapes. However, powder metal parts can easily be formed in a wide variety of shapes, and their magnetic properties are enhanced in the proper sintering atmosphere.

There are several factors to consider when designing a part to be sintered. The shape of the part must allow for its ejection from the die. Thin walls, narrow splines or sharp corners weaken the overall strength of powder metal parts. Having too many levels in the part results in a considerable variation of density, which can be a problem. Shapes should be simplified as much as possible and allow reasonable clearance between the top and bottom pressing. Dies and punches should be made without sharp edges.

(Picture)
Spur and Cluster Gears (Picture)
Fine Pitch Internal Gear
(for sprinkler systems)

(Picture)
Sprinkler System Components

Featured Articles

"Economics and Benefits of High Temperature Sintering of High Performance Alloys"
http://www.hawkprecision.com/G/G01/G01_images/PM2002Economic.pdf "Problems with Heat Treating of P/M Parts"
http://www.metalpowderproducts.com/index.asp?action=technology_bulletinsarticles_articles&id=3

(Picture)
Image Provided by SMC Powder Metallurgy

FIG. 18b

Types

- Aluminum powder is a metal powder made from aluminum materials.
- Metal powder is created through powder metallurgy and can be formed into solid components through the tool and die process.
- Powdered metal is formed into solid components through the application of pressure and heat.
- Powdered metal bearings are often self-lubricating, providing low noise level, space savings and low maintenance requirements. Lubrication is achieved through the impregnation of oil into the bearings, which aids bearing performance during rotary support of moving parts.
- Powdered metal bushings commonly provide support to rotating axles and other shafts in engines, drive systems and other equipment. Like bearings, powdered metal bushings can be lubricated through impregnation to increase efficiency.
- Powdered metal gears are cost-effective and advantageous in industrial applications involving difficult shape requirements. Gears provide speed and directional changes to motion in transmissions, power tools, appliances and a variety of other equipment.
- Powdered metal structural parts are particularly common in the automotive industry in exhaust, fuel and brake systems, engine parts and transmission components. Sintered parts are also found in computer and electronic equipment.
- Sintered bronze is a solid metal made from adhered particles of powered bronze.
- Sintered filters contain uniform porosity, which increases functioning. In addition, sintered filters are strong, easy to clean and heat resistant.
- Sintered metal is a solid product made by a cold forming process that presses metal powder into a coherent mass.

List Your Company    E-mail Sales    Patent Pending    Terms and Conditions    Industrial Quick Search, Inc.

FIG. 18c powderedmetalparts.com
A powder metal parts and powdered metal parts manufacturers directory including powdered metal, powder metal, sintered parts, sintered metal, powder metal product, powdered metal manufacturer, sintered metal parts, powdered metal gears, powdered metal bushings, and sintered metal products.

coldheadedparts.com
die-castings.net
screw-machine-products.com
metalstamper.net Information Page Links:   Back

Featured Powdered Metal Parts Manufacturers

About Powdered Metal Parts

Powder Metal Parts Terms

Powdered Metal Parts Associations

Powder Metal Parts Resources

Trade Shows

Featured Powder Metal Parts Articles

More Articles

ISO - International Organization for Standardization

Powdered Metal Parts Related Trade Shows

PowderMet
http://www.mpif.org/Meetings/2006/06_gateway.htm

International Machine Components Industry Exhibition
http://www.expoua.com/eng/showexhib/9889.html E-mail Sales   Patent Pending   Terms and Conditions

Industrial Quick Search, Inc.

FIG. 19 www.powderedmetalparts.com
Powder Metal Parts. Powder Metal Parts Manufacturers. IQS
Directory has the largest selection of powder metal parts and
company information for powder metal parts manufacturers.

die-castings
metal-stampings
cold-headed-parts
forgings
screw-machine-products

Back to powder-metal-parts - Page 1

Regional Search

Powder Metal Parts Informational Page

| IOS Search | Enter Search Term Here | Search Button |

| Request for Quote Button |

AMKAD Metal Components Inc.
Tavistock, Ontario
519-655-2911

Amkad is a world-class manufacturer of powdered metal products in a variety of ferrous and nonferrous materials. Parts such as cams, gears, levers, oil-impregnated bushings, inserts etc. are supplied to many industries, including automotive, farm machinery, lawn and garden, power tools and general hardware applications. We are ISO 9001-2000 registered, and our personalized service ensures top quality and cost competitiveness.

Advanced Powder Products, Inc.
Philipsburg, PA
888-750-1800

Development and manufacture of net shape metallic components. We practice three technologies:
- Metal Injection Molding (MIM)
- Press and Sinter (P/S)
- Centrifugal Investment Casting (CIC)
Specialization in prototypes, rapid turnaround and microcomponents. ISO 9001:2000 certified.

Allied Sinterings, Inc.
Danbury, CT
203-743-7502

Allied Sinterings is a manufacturer of small, intricate powdered metal parts primarily to the automotive and medical industries. Materials used to produce the powdered metal parts include brass, stainless steel plus straight iron and ferrous NI and CU steels. We are ISO 9002-certified.

Emporium Specialties Co., Inc.
Austin, PA
814-647-8661

Since 1947, Emporium Specialties has been called upon to manufacture powdered metal parts such as bearings, bushings, engine parts, gears, gerotors and more. Emporium manufactures powdered metal parts using bronze, brass, copper, iron, special alloys and stainless steel.

Alpha Sintered Metals, Inc.
Ridgway, PA
814-773-3191

Refer to it as a powdered metal part or sintered metal part, we can produce it. ASM has performed the in-house tooling, manufacturing and prototyping for products used for appliance, automotive, compressor, garden, lawn and recreational vehicle applications. We've been in business since 1967.

Ridgway Powdered Metals Inc.
Ridgway, PA
814-772-5551

The engineering of your powdered metal parts starts here then continues on to production, completion and all the way to final bar coding. As a powdered metal parts manufacturer, we make bearings, bushings, cams, gears and more. We make sintered metal parts and have compaction of 6 to 350 tons.

Bunting Bearings Corp.
Holland, OH
888-286-8464

Bunting Bearings is a manufacturer of sintered bronze metal products—flange, plane, sleeve, thrust bearings plus washers. Sintered bronze bars are also offered. We will use iron, nickel and steel as requested. Our products have served aerospace, automotive, business equipment, military and more.

FIG. 20a

| | |
|---|---|
| National Sintered Alloys, Inc.<br>Clinton, CT<br>860-669-8653 | National Sintered Alloys is a manufacturer of powdered metal parts. We use such materials as brass, bronze, copper, iron, stainless steel and steel. We have manufactured powdered metal parts for automotive, firearms, gear and hardware applications. In business since 1964, in this facility since 1973. |
| Advantage Sintered Metals, Inc.<br>Battle Creek, MI<br>269-964-1212 | Advantage Sintered Metals is a manufacturer of sintered metal parts. The sizes and complexities of the powder metal parts we produce are varied. Committed to providing quality services at competitive prices, ASM works with a variety of materials, including bronze, copper, iron, steel and other alloys. |
| Elcam, Inc.<br>St. Marys, PA<br>814-781-7101 | Zero defects. Does that mean something to you? If that's what you're looking for, look no further than Elcam. We use a three-tiered quality system to ensure our customers get powdered metal parts that are perfect. We machine and provide other secondary services in powdered metal assemblies. |
| Compax, Inc.<br>Anaheim, CA<br>714-630-3670 | Compax is an ISO 9002-certified company specializing in gears, cams, pole pieces, bushings, bearings, armatures, brush holders, blots, clamps, powder metal parts and more. Stainless steel, iron, copper, brass, bronze, nickel, silver and specialty metals are among the many materials used. |
| Metco Industries, Inc.<br>St. Marys, PA<br>814-781-3630 | Metco is a powder metal manufacturer making ferrous and nonferrous items. We design, produce and assemble sintered parts plus powdered metal parts and subassemblies for automotive and non-automotive purposes. Metco Industries is QS 9000 and ISO 9002 certified. We look forward to hearing from you. |
| Precision Powdered Metal Parts, Inc.<br>Pomona, CA<br>888-228-5761 | We manufacture powdered metal parts. These powder metal products include cams, gears, levers, rollers, sprockets and more. Using brass, bronze, copper alloys, iron, nickel alloys and more, we produce products for such industries as appliance, computer, cutlery, power tool and sporting goods. |
| Remington Arms Company, Inc.<br>Ilion, NY<br>315-895-3453 | Via the CompactAlloyâ„¢ powdered metal parts process, we use iron, low alloy steels, soft magnetic materials and stainless steel. Remington Arms Powder Metal Division uses high-temperature sintering to produce the components requested of us. For more information, please visit our website. |
| Chicago Powdered Metal Products Company<br>Schiller Park, IL<br>847-678-2836 | Our name announces our business. Weâ€™ve been in business since 1948 producing molded powder metal parts. Some of the powder metal product weâ€™ve made include cam sprockets, clutch plates, gears, pistons, plumbing equipment, sprockets, surgical tool components. |
| Eastern Sintered Alloys, Inc.<br>Saint Marys, PA<br>814-834-1216 | Eastern Sintered Alloys is a manufacturer of powder metal parts. We provide powdered metal bearings, gears, bushings, washers and other powdered metal parts. We are a QS 9000-certified company, ready to serve a variety of industries with quality powder metal products. |

FIG. 20b

| | |
|---|---|
| Engineered Sinterings & Plastics, Inc.<br>Watertown, CT<br>860-274-8877 | Engineered Sinterings & Plastics is one of America's top complete manufacturers of sintered parts, powdered metal parts and injection molded powdered metal parts since 1953. ESP also offers a line of custom-design parts and products, and has a full line of services to finish powder metal products. |
| Cameron Diversified Products<br>Wilcox, PA<br>800-545-4222 | Cameron Diversified Products is a powdered metal parts leading manufacturer that offers structural powdered metal products. We produce powdered metal bearings, bushings, gears and parts. We operate a quality assurance laboratory to ensure that quality powder metal products are generated. |
| Intech P/M Stainless, Inc.<br>Ridgway, PA<br>814-776-6150 | Since 1985, Intech P/M Stainless has been a leading manufacturer of sintered metal parts. We specialize in stainless steel components and produce sintered parts with up to a five-square-inch top surface. Our stainless steel powdered metal has a corrosion resistance not matched by other companies. |
| Gibraltar Thermal Processing<br>Buffalo, NY<br>716-826-6500 | As the leader in the heat treating industry, Gibraltar Thermal Processing (GTP), a division of Gibraltar Industries, offers processed metal products such as powdered metal parts. We manufacture copper and tin metal powders and have the only U.S. license for Tuff-Koat™ and Cubond® brazing paste. |
| Norwalk Powdered Metals, Inc.<br>Bridgeport, CT<br>203-338-8000 | QS 9000 registered, Norwalk Powdered Metals provides custom engineering with capabilities in finishing, prototyping and testing. We use a wide range of materials for our powder metal parts, including stainless steel, bronze, brass and a range of other alloys. |
| TPI Powder Metallurgy<br>St. Charles, MI<br>989-865-9921 | Custom-designed powdered metal parts are what customers receive from us. We have been in business since 1967 producing powder metal products for appliance, automotive, garden, hardware, hydraulic and lawn industries. Some of the powdered metal parts include bearings, bushings and gears. |
| Asia Sourcing Corp.<br>Minneapolis, MN<br>763-712-8310 | Offering powdered metal parts and sintered parts, Asia Sourcing Corporation's capabilities include heat treating, oxidizing, copper infiltration, plating and more. Brass, bronze, iron and various steels are some of the powder metals we work with to meet your specifications. Call today for information. |
| Dymet Corporation<br>Muskegon, MI<br>231-726-5061 | Dymet is a powdered metal manufacturer producing bearings, bushings, filters, gears, soft magnetics, structural powdered metal parts and more. Aluminum, brass, bronze, nickel, silver, iron and steel alloys are among the materials we use to manufacture the powdered metal product we are contracted to make. |
| Advanced Specialty Metals<br>Nashua, NH<br>603-589-2531 | Our metallurgical expertise is evident. We are the inventor and world leader in the manufacture of PREP® metal powders. Our alloy powders are made from an array of metals. If you need custom manufacturing, we are able to do that as well. Applications: orthopedic and semiconductor industries. |

FIG. 20c

Fansteel American Sintered Technologies, Inc.
Emporium, PA
814-486-0400

Fansteel American Sintered Technologies is a powdered metal manufacturer of cams, gears, oil-impregnated bearings, pawls, levers, ratchets, sprockets and more. Our powdered metal products are made from brass, bronze, copper alloys, nickel alloys, sintered hardened steel and stainless steel.

Powder Metallurgy Company, Inc.
Lewisville, TX
972-436-3502

Since 1973, Powder Metallurgy has been a manufacturer of powdered metal parts for several markets—agriculture, beverage, electronics, food, garden, hand tools, health care, industrial hardware, lawn, petroleum, power tools. We will produce your powder metal product if itâ€™s new or a redesign.

The Wakefield Corporation
Wakefield, MA
800-548-9253

We are a powder metal manufacturer of various powdered metal parts—gears, timing belt pulleys, speed reducer spacers, air conditioner compressor counterweights, institutional food steamer door hinges and more. Materials used include brass, bronze, carbon steel, copper and stainless steel.

Back To powder-metal-parts - Page 1

Search for Company by Region     Powder Metal Parts Informational Page
         IQS Search          | Enter Search Term |   | Search |

Advertise Your Company E-mail Sales        Terms and Conditions    Industrial Quick Search, Inc.

FIG. 20d

Web   Images   Groups   News   Froogle   Local   Appliance

| High-magnetic-response aluminum | Search Button |

---

Search

Powder and powdered metal part manufacturers of powder metal ...
... for Quote, Using strong stainless or high-magnetic-response aluminum, brass, bronze,
copper, exotic alloy or iron, Webster-Hoff manufactures powder metal parts. ...
www.powderedmetalparts.com/ - Cached

*In order to show you the most relevant results, we have omitted some entries very similar to the 1 already displayed.*
*If you like, you can repeat the search with the omitted results included.*

| High-magnetic-response aluminum | Search Button |     Search within results

FIG. 21 www.powderedmetalparts.com
Powder Metal Parts. Powder Metal Parts Manufacturers. IQS Directory has the largest selection of powder metal parts and company information for powder metal parts manufacturers.

die-castings
metal-stampings
cold-headed-parts
forgings
screw-machine-products

Step One:
Choose the companies to send an RFQ to from the list below.

Select Company Name

| Check All |

[X] ASCO Sintering
[ ] Saint Marys Pressed Metal, Inc.
[ ] Webster-Hoff Corporation
[ ] Allread Products, LLC
[ ] SMC Powder Metallurgy Step Two:
Enter your contact info: *Indicates required field Company Name:* Company Name is Required
[                    ]

Contact Name:* Contact is Required
[                    ]

Contact Phone:
[                    ]

Contact Email:* E-Mail is Required Valid E-Mail Required
[                    ]

City, State or Country:* City, State or Country is Required
[                    ]

[x] I would like these companies to contact me about sending an attachment.

Step Three:
What specifications and questions do you have for the manufacturers?
[                    ]

[ Send ]  [ Reset ]

Back To Featured Companies:

Advertise Your Company    E-mail Sales    Terms and Conditions    Industrial Quick Search, Inc.

FIG. 22

IQD RFQ – www.powderedmetalparts.com  3/30/07

Name: Joe User
Company: XYZ Inc.
Email: joe.user@XYZ.com
Contact Phone: 555-555-2323
City, State or Zop: Grand Rapids, MI
The sender would like to send you a file.
We need a quote for 100,000 powdered metal gears, size 1".

Thank you,
Joe User

FIG. 23

IQS Directory - Industrial Manufacturers Directory
IQS Manufacturers Directory

- Site Map

Manufacturers Directory - IQS Manufacturers Directory - Find Manufacturing Companies On IQS Manufacturers Directory IQS Directory
Comprehensive Manufacturers Directory
*Find Leading Industrial Manufacturing Companies, Suppliers and Distributors by Category*

| | | |
|---|---|---|
| 55 Gallon Drums | Assembly Machinery | Cardboard Tubes | Contract Manufacturing |
| AC Motors | Autoclaves | Carrying Cases | Contract Packaging |
| Air Compressors | Automatic Guided Vehicle | Carwash Equipment | Contract Sewing |
| Air Conditioners | (AGV) | Casters | Conveyor Belts |
| Air Conveyors | Balers | Central Vacuum Cleaners | Conveyors |
| Air Cylinders | Ball Bearings | Centrifugal Pumps | Cooling Towers |
| Air Dryers | Ball Screws | Centrifuges | Copper Forgings |
| Air Filters | Ball Valves | Ceramic Magnets | Copper Suppliers |
| Air Heaters | Bevel Gears | Ceramic Manufacturing | Current Transformers |
| Air Pollution Control | Blenders | Check Valves | Data Acquisition Systems |
| Air Pumps | Blister Packaging | Chemical Etching | DC Motors |
| Air Scrubbers | Blow Molding | Chillers | Deburring Equipment |
| Alloy Suppliers | Blowers | Clamshell Packaging | Deep Drawn Stampings |
| Aluminized Steel | Boilers | Clamshells | Die Castings |
| Aluminum Castings | Bolts | Clean Rooms | Die Cutting |
| Aluminum Extrusions | Bowl Feeders | CNC Machining | Dip Molders |
| Aluminum Fabricators | Broaching Job Shops | Coating Services | Dryers |
| Aluminum Forgings | Brush Manufacturers | Coil Springs | Drying Ovens |
| Aluminum Suppliers | Butterfly Valves | Cold Headed Parts | Dust Collectors |
| Anodizing | Cable Reels | Compactors | Dynamometers |
| ASME Tanks | Calibration Services | Continuous Hinges | EDM |

FIG. 24a

Electric Actuators
Electric Heaters
Electric Hoists
Electric Motors
Electric Switches
Electric Transformers
Electroless Nickel Plating
Electronic Connectors
Electronic Enclosure
EMI Gaskets
EMI Shielding
Environmental Chambers
Expanded Metal
Extension Cords
Extension Springs
Fasteners
Fiberglass Fabrication
Fiberglass Tanks
Filtering Systems
Floor Gratings
Flow Meters
Foam Fabricating
Force Gauges
Forgings
Forklift Trucks
Fractional HP Motors
Friction Materials
Furnaces
Gas Detectors
Gaskets
Gear Couplings
Gears
Glass Fabricators Graphic Overlays
Graphite Machining
Grey Iron Castings
Heat Exchangers
Heat Treating
Heating Elements
High Voltage Transformers
Hinges
Hose Reels
Humidity Test Chambers
Hydraulic Cylinders
Hydraulic Lifts
Hydraulic Motors
Hydraulic Press
Hydraulic Pumps
Hydraulic Seals
Hydraulic Valves
I Beams
Industrial Fans
Infrared Heaters
Instrument Cases
Investment Castings
Labeling Machinery
Laser Cutting
Laser Engraving
Laser Marking Equipment
Lasers
Latches
Lead Screws
Leak Detectors
Linear Actuators
Linear Bearings
Linear Slides Liquid Filters
Load Cells
Lubricants
Lubrication Equipment
Machine Guards
Machine Vision Systems
Machined Graphite
Machined Plastic
Machinery Rebuilders
Magnets
Marking Machinery
Membrane Switches
Metal Channels
Metal Etching
Metal Fabricators
Metal Finishing
Metal Spinning
Metal Stampings
Metering Pumps
Metric Fasteners
Mezzanines
Mixers
Modular Buildings
Molded Rubber
Molded Urethane
Nickel Suppliers
Noise Pollution
O-Rings
Ovens
Overhead Cranes
Oxidizers
Packaging Machinery
Paint Finishing Equipment Palletizers
Paper Tubes
Parts Washers
Perforated Metals
Photo Etching
Pipe Bending
Plastic Bags
Plastic Bottles
Plastic Containers
Plastic Drums
Plastic Extrusions
Plastic Fabrication
Plastic Materials
Plastic Molding
Plastic Pallets
Plastic Tanks
Plastic Tubing
Pneumatic Conveyors
Pneumatic Cylinders
Pneumatic Presses
Powdered Metal
Power Cords
Power Supplies
Prefab Buildings
Pressure Gauges
Pressure Switches
Pressure Transducers
Pressure Vessels
Pulverizers
Quick Disconect Couplings
Resistance Temp. Detectors
Roll Forming
Rope Suppliers

FIG. 24b

Rotational Molding
Rubber Extrusions
Rubber Molding
Rubber Rolls
Rubber Sheeting
Rubber To Metal Bonding
Sandblast Equipment
Scales
Scissor Lifts
Screw Conveyors
Screw Machine Products
Sewing Contractors
Shaft Couplings
Sheet Metal Fabrication Shipping Cases
Shock Absorbers
Shredders
Solenoid Valves
Soundproofing
Speed Reducers
Springs
Stainless Steel
Stainless Steel Forgings
Stainless Steel Screens
Stainless Steel Tanks
Stainless Steel Tubing
Static Control
Steel Cables Steel Drums
Steel Fabricators
Steel Service Centers
Steel Shelving
Storage Racks
Teflon Coating
Temperature Chambers
Thermocouples
Titanium
Tube Fabricating
Tube Forming Machines
Tumblers
Ultrasonic Cleaners
Urethane Molding Vacuum Cleaners
Vacuum Forming
Vacuum Pumps
Vertical Conveyors
Vibration Absorbers
Vibratory Feeders
Water Jet Cutting
Wire Cloth
Wire EDM
Wire Forms
Wire Rope
Work Benches
Workstations
YAG Lasers What is the IQS Manufacturers Directory? The IQS Manufacturers Directory is the new companion to Industrial Quick Search that adds new value in finding products, services, manufacturers and manufacturing suppliers.
How Do I Use The IQS Manufacturers Directory? Using the IQS Manufacturers Directory is simple! You can search or browse through our manufacturers directory category structure to find those manufacturing products and services that best meet your needs.
How Do I List On The IQS Manufacturers Directory? To list your manufacturing company in our leading manufacturing directory all you have to do is submit our simple manufacturers directory company listing form, or you can call 800-940-3129 toll free and request information in the best fit for your manufacturing company!

- Home
- Site Map
- List Your Company
- E-mail Sales
- Term and Conditions

Manufacturers Directory Quick Links:
CNC Machining | Load Cells | Flow Meters | Membrane Switches | Test Chambers | Clean Rooms | Metal Stampings | Dust Collectors | Parts Washers | Chillers
Plastic Bags | Ultrasonic Cleaners | Urethane Molding | Laser Cutting | Modular Buildings | Linear Actuators | Plastic

FIG. 24c

Home

Site Map

Parts Washers

Parts washers and industrial parts washers manufacturers including aqueous part washers, automotive part washers, spray washers, aqueous cleaning systems, and parts cleaning equipment.

Aqueous Parts Washers   Automotive Parts Washers   Industrial Washers

Parts Washers

Categories Related To: Parts Washers

Ultrasonic Cleaners    Industrial Dryers
Deburring Equipment    Sandblast Equipment Parts Cleaners    Parts Washer    Parts Washing Machinery

FIG. 25a

Crest Ultrasonics Corporation is a world-wide manufacturer of a line of industrial parts washer systems, parts cleaning washers, spray washers and aqueous part washers that are designed for CFC-free aqueous and semi-aqueous metal parts cleaning. Our quality products maintain competitive prices.

Crest Ultrasonics Corporation
Trenton, NJ
800-992-7378
Request for Quote

Stoelting manufactures a complete line of parts cleaning equipment, including ultrasonic cleaners, aqueous part washers, electronic assembly cleaning equipment and bottle washers for general industrial applications and for the electronics assembly and semi-conductor packaging industries.

Stoelting®
Kiel, WI
800-558-5807
Request for Quote

Alliance Manufacturing specializes in manufacturing aqueous part washers. Products include standard, modified standard and custom-engineered machines for specific applications. System examples include conveyor belt, monorail systems and many more. See our new website.

Alliance Manufacturing, Inc.
Fond du Lac, WI
800-969-7960
Request for Quote

Equipment Manufacturing Corp. offers immediate delivery on industrial parts washer products, aqueous cleaning systems, automotive parts washers and spray washers. We are proven leaders in aqueous part washers and degreasing equipment. Simplicity gets the job done and saves money.

EMC/Equipment Manufacturing Corporation
Santa Fe Springs, CA
888-833-9000
Request for Quote Request for Quote Button Rollover Window Display Area Advertisement!
Advertisement!

FIG. 25b

Partswashers by: Painter Design and Engineering
New Baltimore, MI
586-725-3330
Request for Quote For over 30 years, Painter Design and Engineering has been designing and manufacturing machinery. We build standard and custom-designed aqueous part washers, industrial parts washers and automotive parts washers. We also manufacture painting systems, hydraulic presses and automation equipment.

Grapar Corporation
Warren, MI
800-991-1408
Request for Quote

GraPar Corporation specializes in parts washers, aqueous cleaning systems, degreasing equipment, parts cleaning equipment, aqueous part washers, oil skimmers, u-flow and o-flow parts washers. We offer years of design experience in building quality parts washers and cleaning machinery. Call us today!

Proceco Ltd.
Montreal, Quebec
800-978-6677
Request for Quote

Since 1975, Proceco has provided quality products and services such as industrial parts washers, metal parts cleaning machinery, belt conveyor washers, immersion washers, robotic washers, lean washers, drum washers, aqueous part washers, ultrasonic degreasers and parts cleaning equipment.

Durr Ecoclean-Hydrocarbon Technology
St. Louis, MO
314-692-8388
Request for Quote Edge Technologies, Div. of Hydromat, gains an advantage with Durr's revolutionary, hydrocarbon technology parts cleaners. A closed loop system working under vacuum creates an environmentally safe system producing superior results for washing parts machined in oil. No vents, no drains, no waste.

Request for Quote Button

Rollover Window Display Area

Advertisement!
Advertisement!

FIG. 25C

Regional Search     Additional Companies →

About Parts Washers and Industrial Parts Washers, Including Automotive Parts Washers, Parts Cleaners, Parts Washing Machinery, and Aqueous Parts Washers.

Industrial parts washers are machines that mass clean parts, components or instruments with efficiency and precision, often after coming off the production line. Parts washers can use several methods to clean and/or sanitize depending on the objects being cleaned. Using industrial parts washers ensures that products are clean and sterile before shipment to customers. These machines also streamline the process and provide for hands free cleaning that involves chemicals that may be harmful to touch. Industrial cleaning equipment removes grime, burrs, bacteria, ink, rust and many more contaminants. Small parts through large engine blocks can be accommodated with the appropriate parts washer. Sparkling, pretreated or burr-free components are then ready to meet high quality standards. Industrial parts washers also provide clean parts and prepared surfaces for further processing such as finishing or coating.

Industrial parts cleaning is a general process category that covers a range of cleaning methods from mass (gross) cleaning of heavy industrial components to critical cleaning in class one clean rooms. This being the case, there are many different kinds of industrial parts washing equipment and processes including aqueous cleaning, vapor cleaning, degreasing cleaning and equipment and solvent cleaning or vapor cleaning. Some use immersion, spray or ultra-sonic techniques to obtain results. Conventional parts washing processes and equipment such as hot water cleaning and degreasing equipment is usually adequate for the removal of lubricants, machining oil, grease and other soluble surface debris that is easily apparent to the naked eye. Critical cleaning requires washing finer particles with a higher degree of precision and confirmation of the parts to the standard in the process.

Parts cleaning equipment is crucial for manufacturing processes because many companies require cleaned parts and components either for further processing or for their customer requirements. Specialized parts washing equipment provides for an efficient hands free way to achieve this. Important considerations when selecting cleaning equipment are material of parts, number of parts and the material that needs to be cleaned off. These factors affect the kind of equipment needed, since they range from sink top loading washers to a closed loop cleaning system. Closed loop systems include spray washers or agitators, rinse tanks, drying areas and drain tanks:

FIG. 25d

The industrial parts cleaning industry used to rely heavily on solvents in the cleaning process. Due to changes in regulations and attitudes in relation to anything damaging or potentially damaging to the environment, this has greatly changed. Currently, the more common methods include water based cleaning methods like ultrasonic and aqueous cleaning systems and parts washers and bioremediation methods.

Industrial Parts Washers Image Provided by Ransohoff Inc.
Industrial Parts Washers Image Provided by Painter Design and Engineering Industrial Parts Washers Image Provided by Stoelting Types of Parts Washers, Industrial Parts Washers, Automotive Parts Washers, and Parts Washers Manufacturers.

Aqueous cleaning systems and aqueous parts washing is the use of water and chemicals to cleanse components; agitation, rotations and/or jet spraying along with appropriate detergents, saponifiers and any other additive required to improve solubility and removal of soil Aqueous cleaners are basic, acidic or neutral.

Automotive parts washers are used in automobile manufacturing and repairing processes.

Critical cleaning is a cleaning process with extremely specific requirements so that cleaned parts meet highly stringent standards and have some form of measurability integrated in the process. Industrial cleaning equipment is built to meet extremely strict cleanliness standards Gross cleaning is the most common cleansing process used for industrial applications, and involves the bulk cleaning of products.

Industrial washers are machines that clean industrial parts.

FIG. 25e

Parts cleaners are machines that clean components after they come off the production line.

Parts washer mass cleans heavy industrial components.

Parts washing machinery is the group of mechanisms and machines used to clean industrial parts.

Precision cleaning is the cleansing of parts so there are no contaminants at a predetermined level in the process; following processes cannot support contaminants left from the previous level.

Ultrasonic cleaning is a cleaning process that utilizes vibrations and waves; frequencies between 40 and 400 KHz, emitted by transducer, result in the expansion of air bubbles in a liquid until the bubbles implode in high pressure areas; this is known as cavitation, which causes energy transferals able to displace contaminants from a substrate surface.

Industrial Parts Washers Terms

Abrasive Media – A substance for aggressive cleaning, typically sand, garnet, steel or aluminum oxide.

Acid – Any aqueous mixture having a pH less than seven on a one to 14 scale. Any acidic solution with a pH lower than three is considered strongly acidic.

Acid Cleaning – Cleaning utilizing acids combined with surfactants to removing rust, metal or scale. Acids with a pH lower than six do not work as degreasers.

Acid Pickling – The use of mineral acid to remove scale and rust from metal.

Air Knife – A device that provides a pressurized "curtain" of air for cleansing, cooling or drying.

Alkaline Cleaning – An aqueous cleaning process done with a greater than 7 pH level utilizing phosphates, silicates or other alkaline salts combined with surfactants in water.

FIG. 25f

Biodegradable – Materials that microbial activity can naturally reduce from their original state into simple chemical compounds.

Bioremediation – Nature's way of cleaning using microorganisms (bacteria, enzymes, fungi) to break down the organic compounds in waste or pollutants.

Blow-Off – The use of pressurized air to clean or remove excess water.

Buffers – Solutions of salt in aqueous cleaning systems that maintain a preferred pH level. Aqueous cleaners use buffers since the precipitation and solubility of metals affect the pH level.

Builders – These additives enhance the effectiveness of detergents by sequestering metals like magnesium and calcium. A problem is that a lot of builders contribute to environmental damage, with substances such as phosphates.

Cascade Rinse – A rinsing process that involves transferring product through a sequence of tanks, in which the rinse water in the last rinse tank runs over to previous tanks in the sequence (a countercurrent flow). This permits the product to be subjected to progressively pure water.

Centrifugal Drying – A drying process using a basket quickly spinning for separation of excess oils, water or other substances from parts. A turbine fan installed underneath the basket pulling the air through improves the process.

Closed-Loop System – A parts cleaning system in which the water is purified and then re-circulated through the system after purification treatment; in aqueous cleaning systems, it goes back into the wash and rinse tanks and is a cost saving measure. Membrane, reverse osmosis and ion exchange filtration are typical techniques to purify the water.

Conductivity – The degree to which an aqueous mixture can conduct electricity and an indication of the purity of the water. The level of conductivity is reciprocal to the level of resistance (e.g. the lower the conductivity, the higher the resistance and the greater the water purity).

Contract Cleaning – The use of companies through contracts that specialize in cleaning industrial parts and components and provide services to a wide range of industries and are comprehensive in their operations - from simple aqueous and solvent cleaning to analytical testing.

Convection Oven Drying – A chamber that evaporates water from cleaned components through heated air.

FIG. 25g

Corrosion Inhibitor – A substance used to slow the chemical reaction that causes rust.

Cosolvent System – A cleaning process that utilizes at least two solvents to achieve the cleaning and rinsing. The action of cleaning results from the combination of the characteristics of each solvent involved, which are selected for the greatest optimization of the system in relation to the particular contaminants involved.

Degreaser – A solvent or combined material for removing grease, oils, or fat from substrates.

Deionized (DI) Water – Water that has enhanced purity resulting from the elimination of ionic species.

Detergent – A solution that is a combination of surfactants comprised of both hydrophobic and hydrophilic material for making grease and oil water soluble. Cleaning is actually done when the soil attaches to the hydrophobic group and when the detergent soil mixture is emulsified in the water; the detergent's cleaning capabilities are increased through the addition of builders or other additives.

Diphase Solvents – Solvent cleaners that have an insoluble aqueous level that is typically utilized along with paint strippers; when combined with denser chlorinated solvents, the water becomes the upper level.

Dispersing Agent – This material enhances the stability of particles emulsified in a liquid-solid or liquid-liquid suspension and is also known as an emulsifying agent.

Emulsification – The creation of micelles in a cleaning procedure resulting from the dispersal of liquid or solid globules or fine particles into a bulk liquid.

Eductor – A device that circulates large amounts of solution in the tanks.

Filtration – Cleaning the cleansing solution and trapping the contaminants so the solution can be used for a longer period and so the components being cleansed don't retain any of the soil or particulates.

Hydrophilic – A surfactant molecule that results in the proclivity of the molecule to be water soluble.

Hydrophobic – A water resistant substance.

FIG. 25h

Immersion – Also known as cold cleaning, it is the cleaning that takes place in a tank, usually of a rectangular shape, using an aqueous solution. The cleaning is done primarily through soaking in a water chemical solution.

Inhibitors – Additives that impede harmful chemical reactions between an aqueous cleaner and a substrate. Inhibitors typically retard the corrosion process of non-ferrous substrates in high pH or iron.

Liquid Agitation – The use of mechanical energy via a circulation pump to circulate cleaning solution, effective for components with flat surfaces or those that have a simple configuration.

Micelle – An amalgamation of solutions with both hydrophilic and hydrophobic properties that trap non-water soluble oils. Dispersal of detergents and other surfactants results in micelles.

Nozzle Drying – The use of nozzles to aim air at specific areas of a component for water removal.

Pressure Drying – A process in which a cleansed component with intricate passages is subject to a clamping procedure and forced air enters the passages and dries the part.

Rinse Stage – To flood the washed components with clean water or a rinse solution.

Sequestrant – A binding agent that prevents chemical reactions.

Solubility – A substance's capability to dissolve within another substance, usually a solid in water. Quantification is in grams per liter, and the general classifications for material solubility are fully soluble, partially soluble, slightly soluble and insoluble.

Solvent – In cleaning systems, a liquid substance that cleans a part by dissolving the surface contaminants.

Sludge – Heavy soils that sink to the bottom of an aqueous solution.

Soaking – Allowing components to rest in cleaning solution so chemicals can "lift" the dirt.

Substrate – In reference to industrial part washing, any item with contaminant or soil on it that is being exposed to a cleaning process.

FIG. 25i

Surfactant – An abbreviation of "surface active agent," it is a common additive for lowering the surface tension between an aqueous cleaning solution and hydrophobic soils in order to loosen the soil or other contaminants. Detergents are principally composed of surfactants.

Terpenes – Organic compounds that occur naturally and are usually found in essential oils. Utilized as cleaning agents in semi-aqueous cleaners, they come from natural sources like citrus fruit or pine trees.

Vacuum Drying – A process that is particularly useful for evaporation of water at a relatively cool temperature. A vacuum pump is used to dry the product.

Vertical Part Agitation – An up-and-down movement of components to allow cleaning solution to remove contaminants; vertical part agitation is effective for parts with cavities.

Wastewater – Soiled water from the cleansing process.

- Home
- Site Map
- List Your Company
- Term and Conditions    E-mail Sales

Phone: 877-977-5377

Home

Manufacturers Directory Quick Links:
CNC Machining | Load Cells | Flow Meters | Membrane Switches | Test Chambers | Clean Rooms | Metal Stampings | Dust Collectors | Parts Washers | Chillers
Plastic Bags | Ultrasonic Cleaners | Urethane Molding | Laser Cutting | Modular Buildings | Linear Actuators | Plastic Containers | Aluminum Extrusions | Roll Forming

FIG. 25j

Site Map

Home

Parts Washers

Parts Washers

Categories Related To: Parts Washers

Ultrasonic Cleaners    Industrial Dryers

Deburring Equipment   Sandblast Equipment

Parts washers and industrial parts washers manufacturers including aqueous part washers, automotive part washers, spray washers, aqueous cleaning systems, and parts cleaning equipment.

IQS Regional Search

Select a region to display companies listed in www.iqsdirectory.com

FIG. 26a

METHOD AND SYSTEM TO ESTABLISH A COMMUNICATIVE CONNECTION BETWEEN A SUPPLIER AND A CONSUMER OVER THE INTERNET

CROSS-REFERENCE TO RELATED APPLICATIONS

This application is a continuation of U.S. patent application Ser. No. 11/731,992, filed on Apr. 2, 2007, the disclosure of which is hereby incorporated by reference in its entirety. U.S. patent application Ser. No. 11/731,992, now U.S. Pat. No. 8,538,822 filed on Apr. 2, 2007, claims the benefit of United States Provisional Patent Application No. 60/787,848, filed on Mar. 31, 2006, the disclosure of which is hereby incorporated by reference in its entirety.

SUMMARY OF THE INVENTION

The present invention generally relates to the establishment of a communicative connection between a supplier of goods or services and a potential consumer of such goods or services over the Internet via a Web site or Web sites specially engineered so that conventional Internet search engines consider the Web site(s) to be (a) highly relevant Web site(s).

The Internet is a collection of interconnected computer networks, which are linked together. The computers and computer networks that comprise the Internet electronically communicate using Internet Protocol (IP) and Transmission Control Protocol (TCP). Each computer and computer network has a unique "address" on the Internet, called an Internet Protocol address (IP address). The World Wide Web (a/k/a "www" or "Web") is a collection of interconnected documents, files, among other things, that are linked together by hyperlinks and URLs. Hypertext Transfer Protocol (HTTP) is one of several application layer protocols that utilizes the Internet to link and provide access to the documents, files, among other things, that are part of the Web. Those documents, files, among other things, are called Web documents. A Web page is a type of Web document. A Web page can consist of files of static text stored within a file system of a Web server. The static text is usually in HyperText Markup Language (HTML) format or Extensible HTML (XHTML) format. A Web server is a computer that is responsible for accepting HTTP requests from another computer and providing HTTP in response, such as a Web page. A user, via a computer linked to the Internet, can retrieve a Web page from a local computer or from a remote Web server, which "publishes" the Web page on the Web. The user's computer retrieves the Web page from its location via a Web browser, which then depicts the Web page on a connected monitor. One Web page can provide a way of navigation to another Web page via a hypertext link ("link"). The Web browser is a software application, such as Microsoft's Internet Explorer and Mozilla's Firefox that formats HTML information for display. An embedded link is a link that is embedded in an object such as the Web page's text (hyper text). A person can create a Web page using a text editor or a specialized HTML editor, which is a software application such as CSS, XML, JavaScript, and ECMAScript. A Web site is a collection of Web pages and other types of Web documents that are hosted on a particular domain (or sub-domain) within the Web. A domain's name identifies the Web site and appears as a component of a Web site's Uniform Resource Locator (URL). The domain name is a stand in for numeric IP addresses. A specific domain name is obtained through a domain name registrar, such as VeriSign and Go Daddy.

A potential consumer of goods or services who has tried to locate information about suppliers of a particular good or service via the Internet typically has to use a Web search engine, which is an information retrieval system. Examples of such Web search engines are the search engines that the websites http://www.google.com (GOOGLE®) and http://www.yahoo.com (YAHOO®) provide. Unfortunately, such Internet search engines must rely on the search engine's algorithm to determine the Web sites that are the most relevant to the user based on the user's search terms. The search engine then lists (i.e., ranks) those Web sites at the top of the list; the search engine lists less relevant Web sites later. A typical user then selects the Web site of suppliers that are near the top of the list. Consequently, many Web site designers design their Web sites so that a search engine lists the Web site near the top of the list, which increases the number of times a user visit their Web site. Although a particular search engine's algorithm is typically a closely guarded trade secret, most major search engines follow the same general rules.

Generally, although what the algorithm used by a conventional search engine is not known for certain, Applicant believes a particular search engine's algorithm, at least preliminarily, ranks the Web pages that the search engine has located based on the location and frequency of keywords (e.g., the user's search terms) on a Web page. For example, Web pages containing a particular user's search term, in the domain name or in the header/title html tags, are typically more relevant than other Web pages to the topic being searched by the user. Consequently, a Web page having a particular search term in the header tag is often assumed to be more relevant by the search algorithm. Applicant also believes search engines check to see if a user's search term appears near the top of the page. The search engine's algorithm assumes that any Web page relevant to the topic will mention the user's search term in the headline or in the first few paragraphs of the text.

Frequency is another major factor search engines use to determine relevancy of a Web page to a specific user's search term. A search engine will analyze how frequently keywords appear in relation to other words on a Web page. The Web pages where the user's search term appears with a higher frequency are often deemed more relevant than other Web pages.

Some search engines utilize other ingredients to qualify further the typical location and frequency algorithm methods described above. One of the most often used fields that are searched is a Web site's metatags. However, not all search engines read metatags. Metatags are a placeholder for storing information that may or may not be processed by an HTTP server or indexed by a search engine.

The final main feature Applicant believes most search engines use to rank and display the most relevant web pages to the user's search query includes an analysis of how pages link to each other. In this manner, a search engine can better determine what a Web site is about and whether the Web site deserves a higher ranking. Links to other related Web sites outside of a given Web site typically result in a higher ranking. Some search engines also screen out attempts by computer users to build into their Web sites false links, which the Web site designer could include in an attempt to boost their rankings.

Unfortunately, a potential consumer attempting to locate a supplier of particular goods or services using a conventional search engine may be successful in locating Web sites for only a few of the multitude of suppliers of those particular goods or services. Searching using this technique is too laborious, inefficient, and time-consuming for many potential consumers and, especially, for a professional or business person who needs quick access to information about the suppliers' particular goods and services in order to compare the various suppliers and decide which supplier would best fulfill their needs. Oftentimes, a conventional search will reveal only two or three suppliers of particular goods but will not locate the Web sites of many other suppliers of particular goods or services because those many other suppliers' Web sites did not achieve, for whatever reason, a high enough ranking on a particular search engine to be listed near the top of the list of search results.

Consequently, there is a significant need for a Web site that is a directory of suppliers of goods or services, which Web site is engineered so that a search engine can easily locate and list the Web site near the top of the results in response to a user's (i.e., a potential consumer's) search and which contains a higher level of comparative searching than traditional search engines. In addition, there is a significant need for such a Web site directory to include numerous links to a variety of suppliers of particular goods and services while providing the potential consumer easy and quick navigation to and from the Web sites of those suppliers so that the user can find more detailed information about the supplier. There is also a significant need for the directory Web site to provide a means for the user to communicate with a supplier or group of suppliers in order to, among other things, request quotes and/or additional information from those suppliers on the directory Web site.

SUMMARY OF THE INVENTION

The present invention includes a directory Web site that is engineered to permit a potential consumer of a particular good or service to locate easily and quickly a list of suppliers of the good or service via the Internet. The directory Web site displays a directory of suppliers for a particular good or service. The Web site has a site domain name portion of the Web site Internet address (URL). The Web site domain name or Internet address typically includes the name or other descriptor of the class of the good or service the suppliers listed on the directory Web site. For example, a Web site of the present invention that displays a directory of suppliers of air compressors typically uses the domain name http://www.aircompressors.bz; the good supplied—air compressors—is included in the Web site domain name. Alternatively, the name or other descriptor can be found outside the domain name but within the Internet address. In addition, a directory Web site of the present invention typically provides links to the Web sites of the various suppliers of the particular good or service. In addition, the directory Web site(s) of the present invention typically displays a description of the supplier that is typically substantially adjacent to the link to the particular supplier's Web site. In addition, the directory Web site of the present invention typically displays a title for the directory of suppliers of a particular good or service, which title typically substantially corresponds to the good or service that the list of suppliers supply. For example, a directory Web site according to an embodiment of the present invention that displays a directory of suppliers of air compressors additionally displays, as a title, www.aircompressors.bz. In addition, a directory Web site according to an embodiment of the present invention provides a means/mechanism whereby whenever the user of the directory Web site (likely a potential consumer of a good or service of the class of good or service of the directory Web site) moves the cursor over the name of a particular supplier, the Web site of the present invention displays a pictorial advertisement (sometimes called a "rollover window") for that particular supplier. Usually, the rollover window is fixedly placed on the directory Web site and optionally framed. In addition, a directory Web site according to an embodiment of the present invention typically provides at least one link to a supplier communication initiating Web page, which is typically displayed in a new browser window, that enables the user (likely a potential consumer of a particular good or service) to submit a communication to one or more suppliers of the particular good or service, which communication includes a request for information from the supplier(s) or a request for a quotation from the supplier(s). The at least one link to this separate Web site or Web page is typically located substantially adjacent to the name of the supplier to whom the supplier would like to submit a correspondence. Typically, a link to the communication initiating Web site is located substantially adjacent to the name of each supplier of the directory Web site. More typically, a separate link located such that it is not associated with a particular supplier, i.e., not proximate any supplier name, as well as a link located substantially adjacent to the name of each supplier such that the user associates the link with the supplier name proximate the link.

The Web page that enables the user (likely a potential consumer of a particular good or service) to submit a communication to one or more suppliers of the particular good or service typically includes a supplier selector portion, which permits the user to select the supplier(s) to whom the user would like to submit a communication, and an information input portion, which permits the user to input the information that the user desires to communicate to the supplier(s). The Web page that enables the user (likely a potential consumer of a particular good or service) to submit a communication to one or more suppliers of the particular good or service further comprises an automatic selection mechanism, which automatically selects the supplier(s) to whom the user could thereafter submit a communication when a user selects the link proximate one of the suppliers. That supplier whose name is proximate the link on the directory Web site would automatically be preselected when the separate browser window appears. This would function for each link proximate each supplier name. The supplier selector portion of the supplier communication initiating Web site typically contains the name of the supplier and a selection box next to the name of the supplier. The information input portion/field permits the user to input information, such as the user's name, contact information, questions and comments. The Web site of the present invention can be linked to another Web site that provides links to a plurality of other Web sites of the present invention, for example a master Web site that includes links to a plurality of directory Web sites, the domain names or Internet addresses of which include the name of separate goods or services.

Another embodiment of the present invention includes a method of doing business, typically assisting suppliers in locating customers and/or assisting customers in identifying suppliers and requesting information from one or more suppliers of a good or service simultaneously thereby establishing communication between customers and suppliers of a good or service. The method(s) typically includes the steps of providing a Web site that is engineered to permit a potential consumer of a particular good or service to locate easily and quickly a list of suppliers of the good or service. The Web site displays a directory of suppliers for a particular good or service. The Web site has a site domain name. The Web site's domain name includes the name of the good or service, of which the suppliers listed in the directory supply. For example, a directory Web site that displays a directory of suppliers of air compressors typically uses the domain name http://www.aircompressors.bz; the good supplied—air compressors—is included in the Web site domain name. Alternatively, the name or other descriptor can be found outside the domain name, but within the Internet address. In addition, a directory Web site according to an embodiment of the present invention typically displays links to the Web sites of various suppliers of the particular good or service. In addition, the directory Web site typically displays a description of the supplier substantially adjacent to the link to the particular supplier's Web site. In addition, the directory Web site typically displays a title for the directory of suppliers of a particular good or service, which title substantially corresponds to the good or service that the list of suppliers supply. For example, a directory Web site according to an embodiment of the present invention that displays a directory of suppliers of air compressors additionally displays, as a title, www.aircompressors.bz. In addition, a directory Web site according to an embodiment of the present invention provides a means/mechanism whereby whenever the user of the directory Web site (likely a potential consumer of a good or service of the class of good or service of the directory Web site) moves the cursor over the name of a particular supplier, the directory Web site of the present invention displays a pictorial advertisement (sometimes called a "rollover window") for that particular supplier. Usually, the rollover window is fixedly placed on the directory Web site and optionally framed. In addition, a directory Web site according to an embodiment of the present invention typically provides at least one link to a supplier communication initiating Web page, which is typically displayed in a new browser window, that enables the user (likely a potential consumer of a particular good or service) to submit a communication to one or more suppliers of the particular good or service, which communication typically includes a request for information from the supplier(s) selected by the user, typically includes a request for a quotation from the supplier(s). The at least one link to this separate Web site is typically located substantially adjacent to the name of the supplier to whom the supplier would like to submit a correspondence. Typically, a link to the communication initiating Web site is located substantially adjacent to the name of each supplier of the directory Web site. More typically, a separate link is located such that it is not associated with a particular supplier, i.e., not proximate any suppliers name, as well as a link located substantially adjacent to the name of each supplier such that the user associates the link with the supplier name proximate the link.

The Web page that enables the user (likely a potential consumer of a particular good or service) to submit a communication to one or more suppliers of the particular good or service typically includes a supplier selector portion, which permits the user to select the supplier(s) to whom the user would like to submit a communication, and an information input portion, which permits the user to input the information that the user desires to communicate to the supplier(s). The Web page that enables the user (likely a potential consumer of a particular good or service) to submit a communication to one or more suppliers of the particular good or service further comprises an automatic selection mechanism, which automatically selects the supplier(s) to whom the user could thereafter submit a communication when a user selects the link proximate one of the suppliers. That supplier whose name is proximate the link on the directory Web site would automatically be preselected when the separate browser window appears. This would function for each link proximate each supplier name. The supplier selector portion of the supplier communication initiating Web page typically contains the name of the supplier and a selection box next to the name of each supplier. The information input portion/field permits the user to input information, such as the user's name, contact information, questions, and comments. The Web site can be linked to another Web site that provides links to a plurality of other Web sites, for example a master Web site that includes links to a plurality of directory Web sites, the domain names or Internet addresses of which include the name of separate goods or services.

These and other features, advantages and objects of the present invention will be further understood and appreciated by those skilled in the art by reference to the following specification, claims, and appended drawings.

BRIEF DESCRIPTION OF THE DRAWINGS

FIG. 11 shows an embodiment of the Web page (browser omitted) that enables the user to submit a communication, such as a request for a quotation, to one or more suppliers of the particular good or service;

FIG. 12 shows an embodiment of the Web page (browser omitted) that wherein the user selects the supplier with which the user will communicate and where the user enters the user's contact information and any particular information to communicate to the selected supplier(s);

FIG. 13 shows an example master Web site (browser omitted), which provides a plurality of embedded links to Web pages, which utilize domain names that incorporate the name of the good or service;

FIG. 14 shows an example Web page (browser omitted) that provides an embedded link to a Web page that provides statistics about the number of visitors to a directory Web site.

FIG. 16 shows an example Web page (browser omitted) that provides statistics for the directory Web site aircompressors.bz, which provides a list of suppliers for air compressors;

FIG. 17 shows an example directory Web site (browser omitted) for suppliers of powdered metal parts;

FIGS. 18a-18c show an example information Web page (browser omitted);

FIG. 19 shows an example of a linked further information Web page (browser omitted);

FIGS. 20a-20d show an example second tier Web page (browser omitted) of a directory Web site, which second tier Web page does not utilize a rollover window display area advertisement;

FIG. 21 shows a Web page display of the results of a search function (browser omitted);

FIG. 22 shows an example communicate with supplier Web site (browser omitted);

FIG. 23 shows a sample electronic mail from the user to the selected supplier generated by the communicate with supplier Web site;

FIGS. 24a-24c show the display of an example master directory Web site (browser omitted) according to another embodiment of the invention;

FIGS. 25a-25j show the display of an example directory Web site (browser omitted) for the goods parts washers that utilizes multiple rollover window display areas; and FIGS. 26a-26b show the display of an example regional selection mechanism (browser omitted) for suppliers.

DETAILED DESCRIPTION

Figure 1:
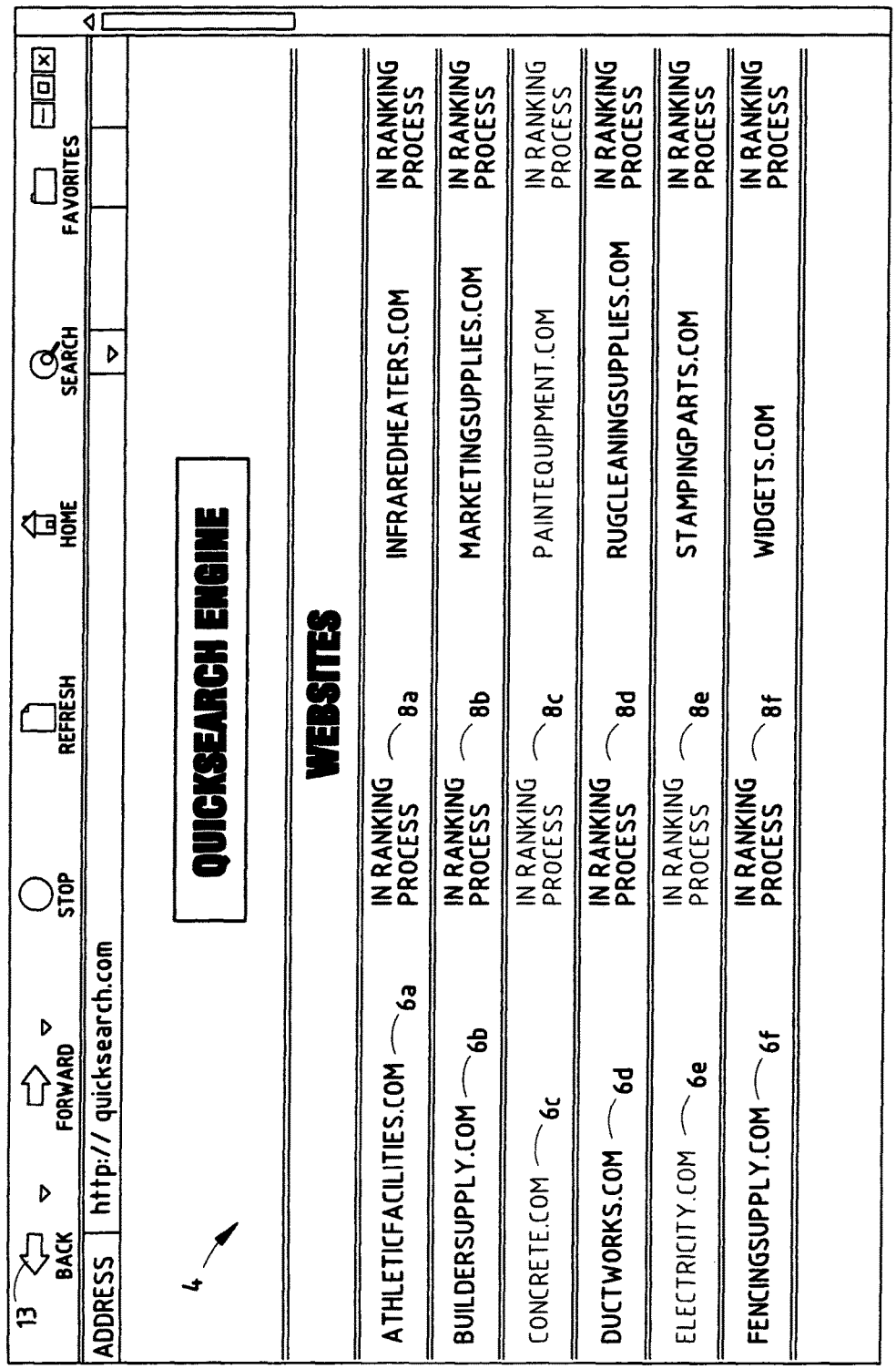
FIG. 1 shows a master Web site, which displays a layout of a links to a plurality of directory Web sites, the domain names of which include the name of a good or service according to an embodiment of the present invention.
Figure 4:
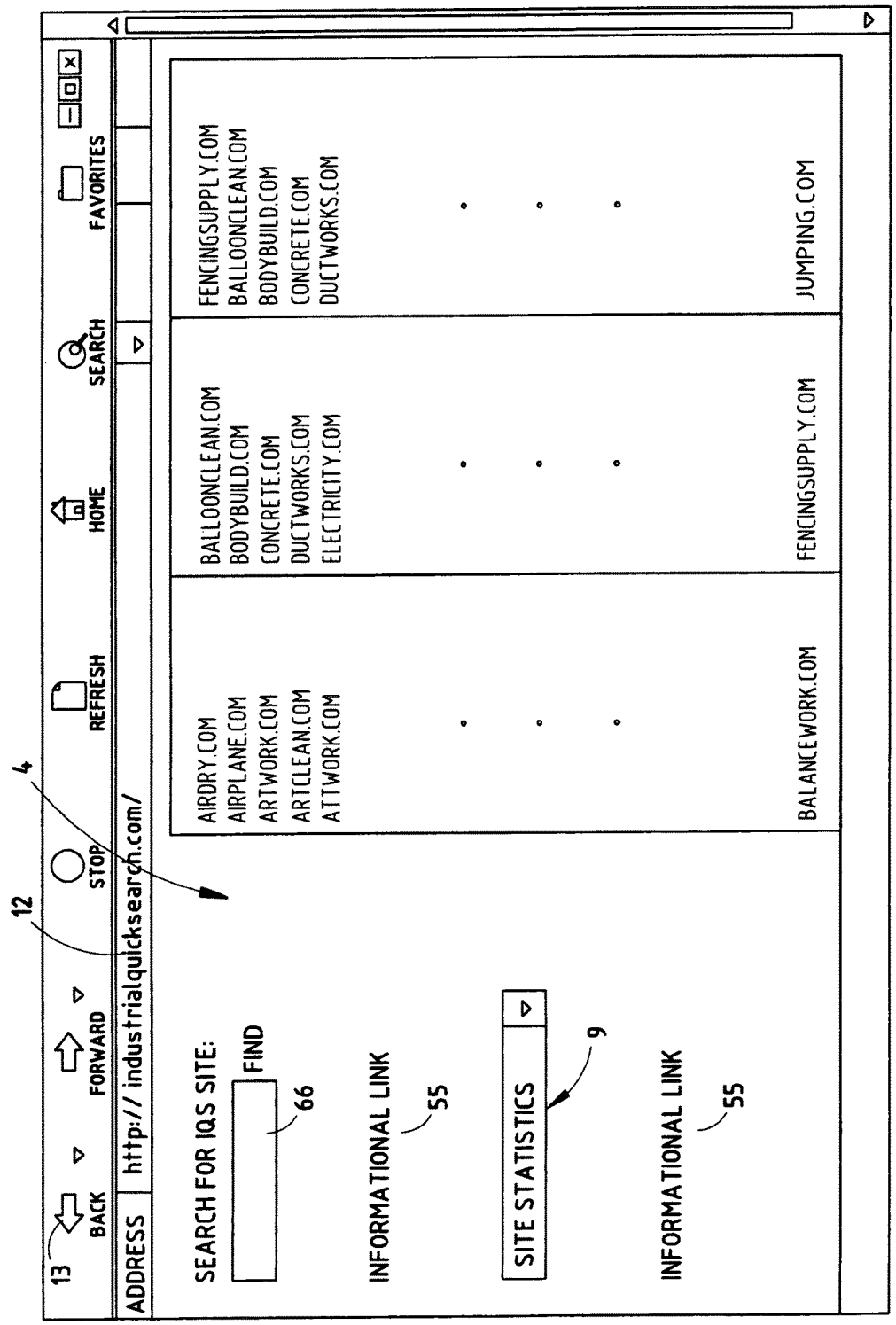
FIG. 4 shows an alternative directory Web site display according to an embodiment of the present invention, which master Web site includes a layout of links to a plurality of directory Web sites, the domain names of which include the name of a good or service, and a search function.

As shown in FIG. 1, a master Web site 4 generally includes a link to a plurality of directory Web sites 6a, 6b, 6c, 6d, etc., where each of the links, which describe a good or service, to a plurality of directory Web sites 6a, 6b, 6c, 6d, etc., send a user to a directory Web site when the user activates the link to a Web site that utilizes a domain name or portion of an Internet address that includes the name or other descriptor of a particular good or service of the directory Web site. The master Web site 4 further could include a plurality of ranking links 8a, 8b, 8c, 8d, etc., which when activated, links a user to a Web page that communicates to the user how many other users had previously visited the particular corresponding directory Website from each of the plurality of directory Web sites 6a, 6b, 6c, 6d, etc. For example, the ranking link 8a, when activated, links the user to a Web page that communicates to the user how many other users had previously visited the corresponding directory Web site directory 6a. Alternatively, the master Web site could include a drop-down list 9, which, when activated by the user, could display the plurality of ranking links 8a, 8b, 8c, 8d, etc., as shown in FIG. 4 (the drop-down list 9 non-activated). Information regarding how many other users had previously visited the particular corresponding directory Web site from each of the plurality of directory Web sites 6a, 6b, 6c, 6d, etc., could be important for a potential consumer searching for a supplier of a particular good or service to estimate how useful any particular directory Web site was to other potential consumers. In addition, such information could be helpful to a supplier of a particular good or service who is considering purchasing advertising on a particular directory Web site 10 (see FIG. 5) for a particular good or service. More users utilizing a particular directory Web site 10 results in more value to the supplier because of the increased chance that the supplier's advertisement/listing would be viewed by a potential consumer of the supplier's good or service and thereby an increased chance that the supplier's Web site link 18 would be activated.

One way to identify suppliers of a particular good or service, according to the invention, involves utilizing a conventional search engine. In doing so, a user searching for companies offering a particular good or service would insert a search term, such as the name of the good or service for which the user is searching. For example, a user searching for supplier of widgets would insert the name of the good, i.e., "widgets," into a conventional search engine, such as the search engine provided by GOOGLE® or YAHOO®. The search results would, more than likely, list a particular directory Web site 10 engineered according to the present invention near the top of the list of Web sites that the search engine found pursuant to the search term that the user entered.

Figure 2:
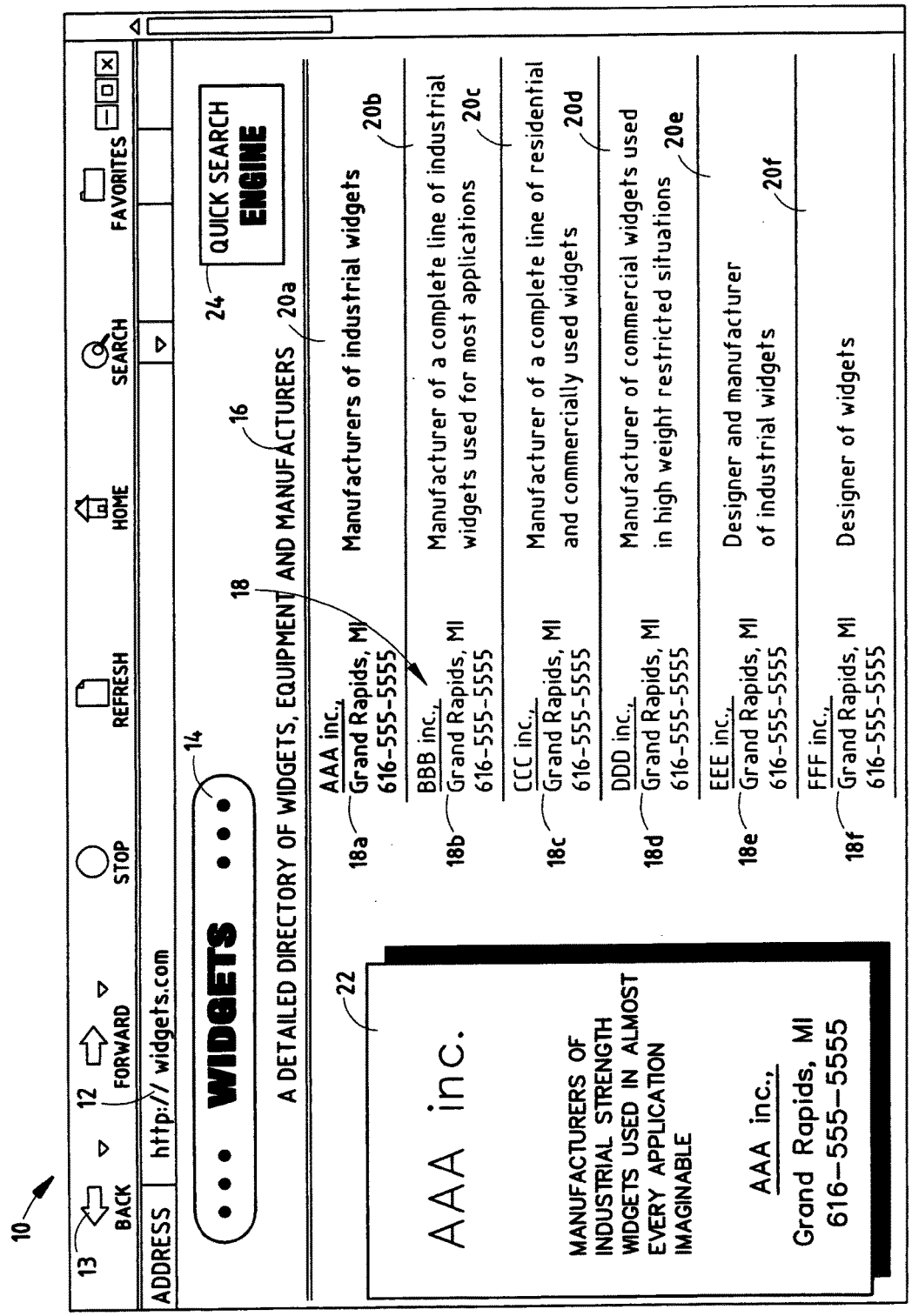
FIG. 2 shows a directory Web site for "widgets," which is a hypothetical good according to an embodiment of the present invention, and the links to the Web sites of suppliers that supply widgets.

Applicant believes a conventional search engine lists a particular directory Web site 10, according to the present invention, near the top of the list of Web sites because the directory Web site 10 advantageously employs related elements in each of the areas where a conventional search engine locates information pertinent to the user's search query. Additionally, Applicant believes that when a portion of the Internet address, typically after ".com" or other level domain name, is used to describe the class of goods or services of each directory Web site, and the remainder of the address preceding the top level domain such as .bz, .com, .net, or .org remains the same, this facilitates higher rankings by conventional search engines. It is believed this is due to the fact that there are so many active links under one umbrella domain name with numerous sub-pages where each sub-page is a directory Web site. Regarding the layout of the directory Web site, for example, as shown in FIG. 2, if a user was searching for suppliers of the hypothetical good-widgets, a directory Web site 10, constructed according to an embodiment of the present invention, utilizes a domain name 12 that incorporates that name of the good, such as http://widgets.com or http://widgets.bz. Alternatively, the name of the good could, as discussed above, be a different part of the Internet address, for example, http://www.zzz.com/widgets. In addition, the present invention incorporates a header 14 and text 16. The header 14 located proximate the top of the directory Web site typically includes the name of the particular good or service of which the directory Web site 10, or the domain name for the directory Web site 10. The text 16 comprises a grouping of words that further describe the particular good or service for which the directory Web site 10.

Figure 3:
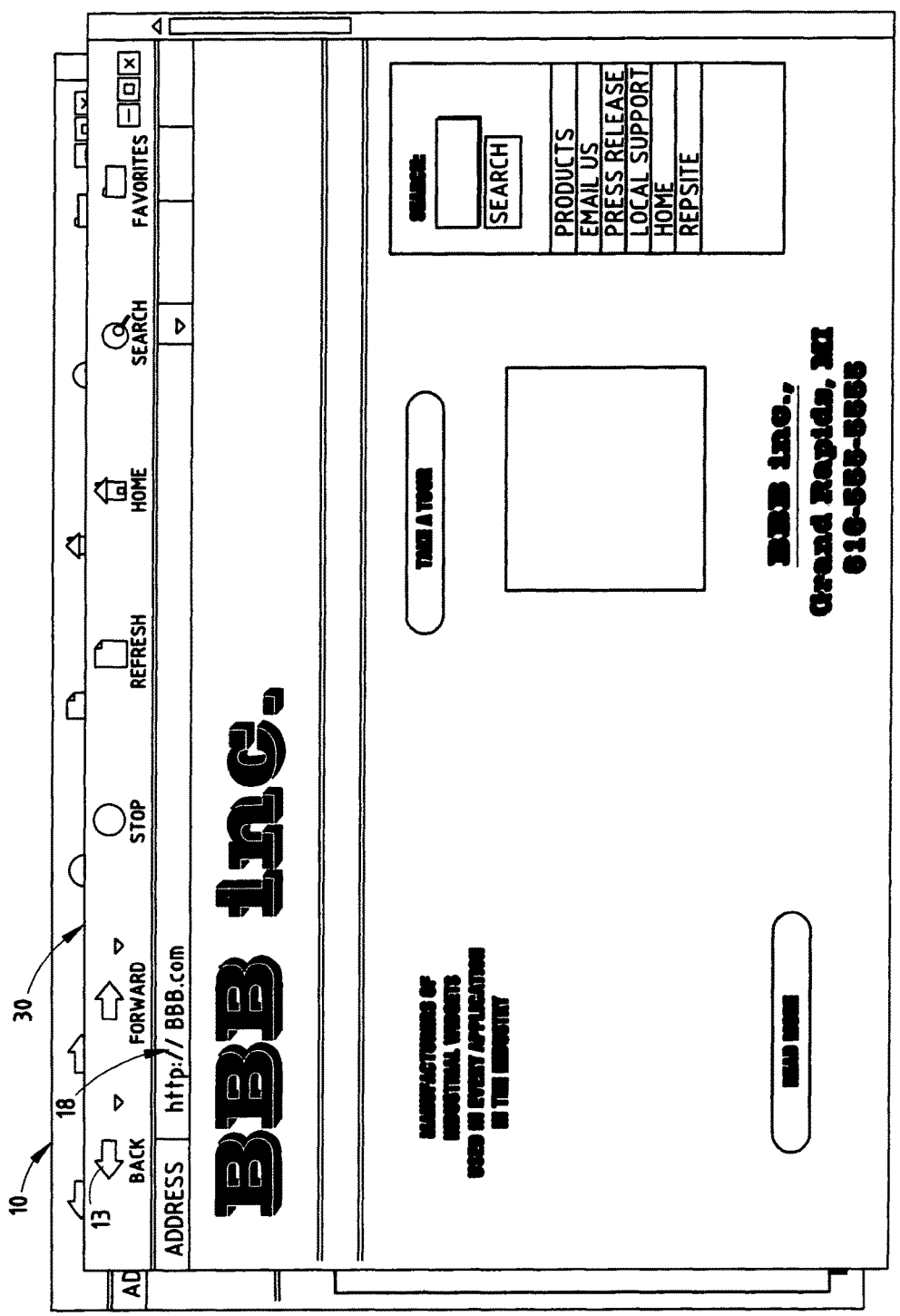
FIG. 3 shows a subsequent window according to an embodiment of the present invention displaying the Web site of "BBB inc.", which is a supplier of widgets, while the separate window displaying the directory Web site remains open.

In addition, the directory Web site 10 provides a list of various suppliers 18a, 18b, 18c, 18d, 18e, 18f, etc., which suppliers offer the particular good or service for which the user is searching and which is the subject of the directory Web site. In addition, the directory Web site 10 provides a description for the various suppliers 20a, 20b, 20c, 20d, 20e, 20f, which description includes the name of the supplier, the supplier's address, the supplier's telephone number, a description of the supplier, and a description of the good or service that the supplier supplies. Typically embedded into the display of the name of the supplier is the supplier's Web site link 18. However, the link to the supplier's Web site could be provided separate from the supplier's name but positioned proximate the supplier's name such that the user associates the link with the supplier. In such instances, the link could be displayed by a simple name such as "Web site." When the supplier's name contains the link to the supplier's Web site, by way of example, included in the list of various suppliers 18a, 18b, 18c, 18d, 18e, 18f, etc. of FIG. 2 is the supplier 18b. The supplier identified as 18b has the fictitious name BBB, Inc., is located in Grand Rapids, Michigan, and has a telephone number of 616-555-5555. The description 20b for supplier 18b is that supplier 18b is a "Manufacturer of a complete line of industrial widgets used for most applications." Embedded into the display of the name of supplier 18b is the supplier's Web site link 18. The supplier's Web site link 18, in this instance, is http://BBB.com, as shown in FIG. 3.

Figure 5:
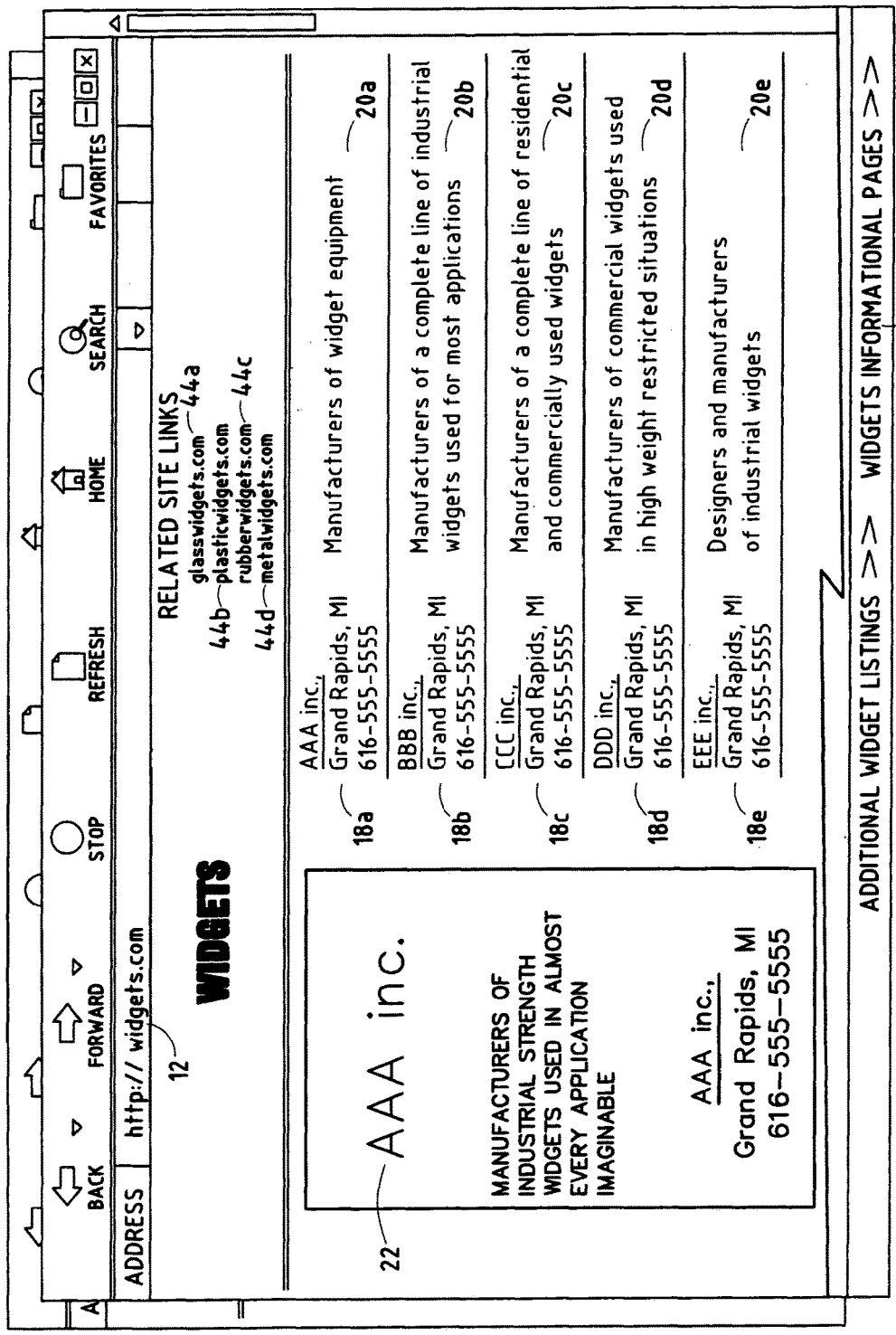
FIG. 5 shows another embodiment of a directory Web site, here for "widgets," according to the present invention, which directory Web site includes a "rollover window" pictorial advertisement for the fictitious widget supplier "AAA inc."
Figure 8:
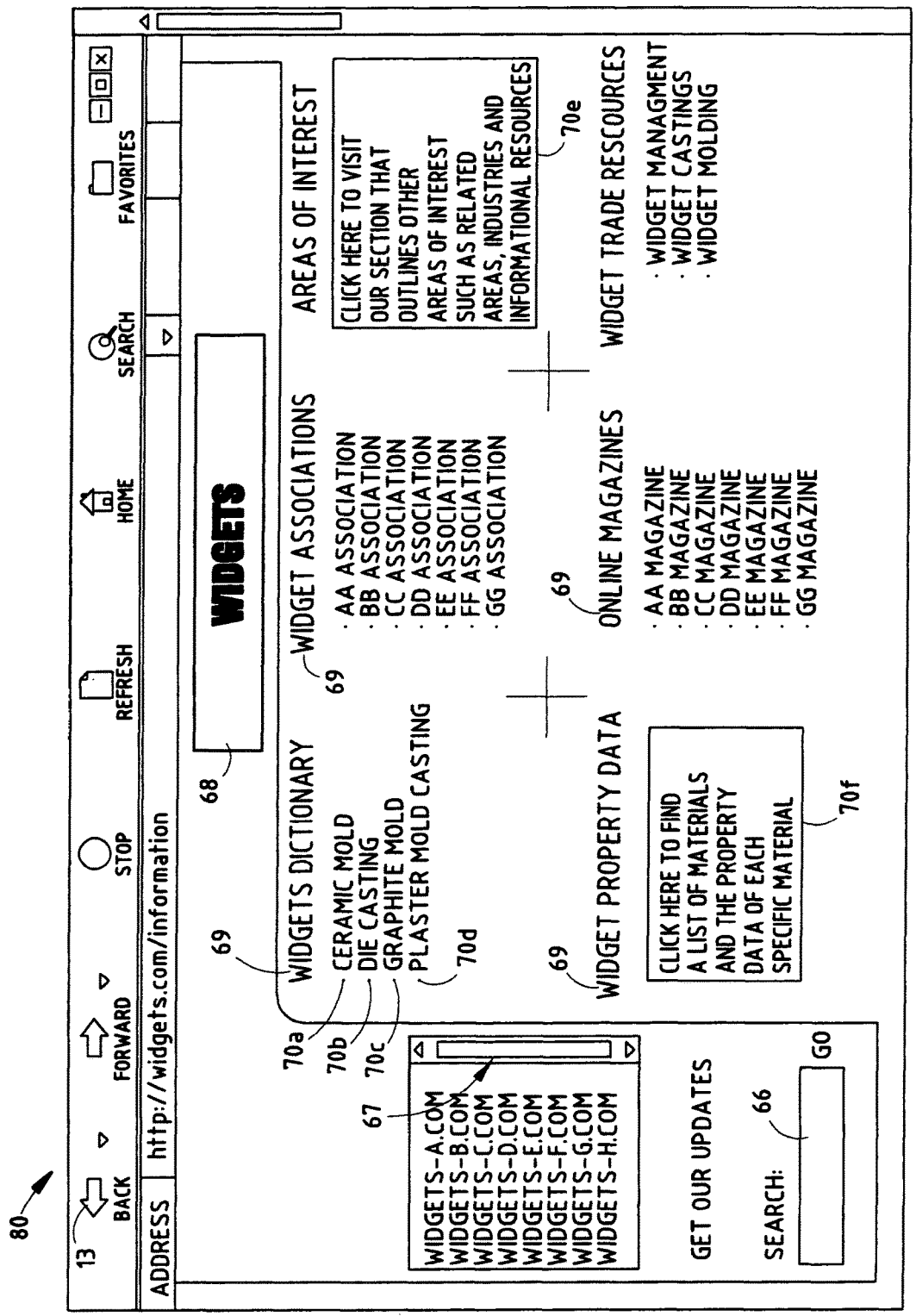
FIG. 8 shows another embodiment of a directory Web site, which embodiment includes links to Web sites that provide reference information regarding the good or service that is the subject of the directory Web site (here, the hypothetical good "widgets")
Figure 9:
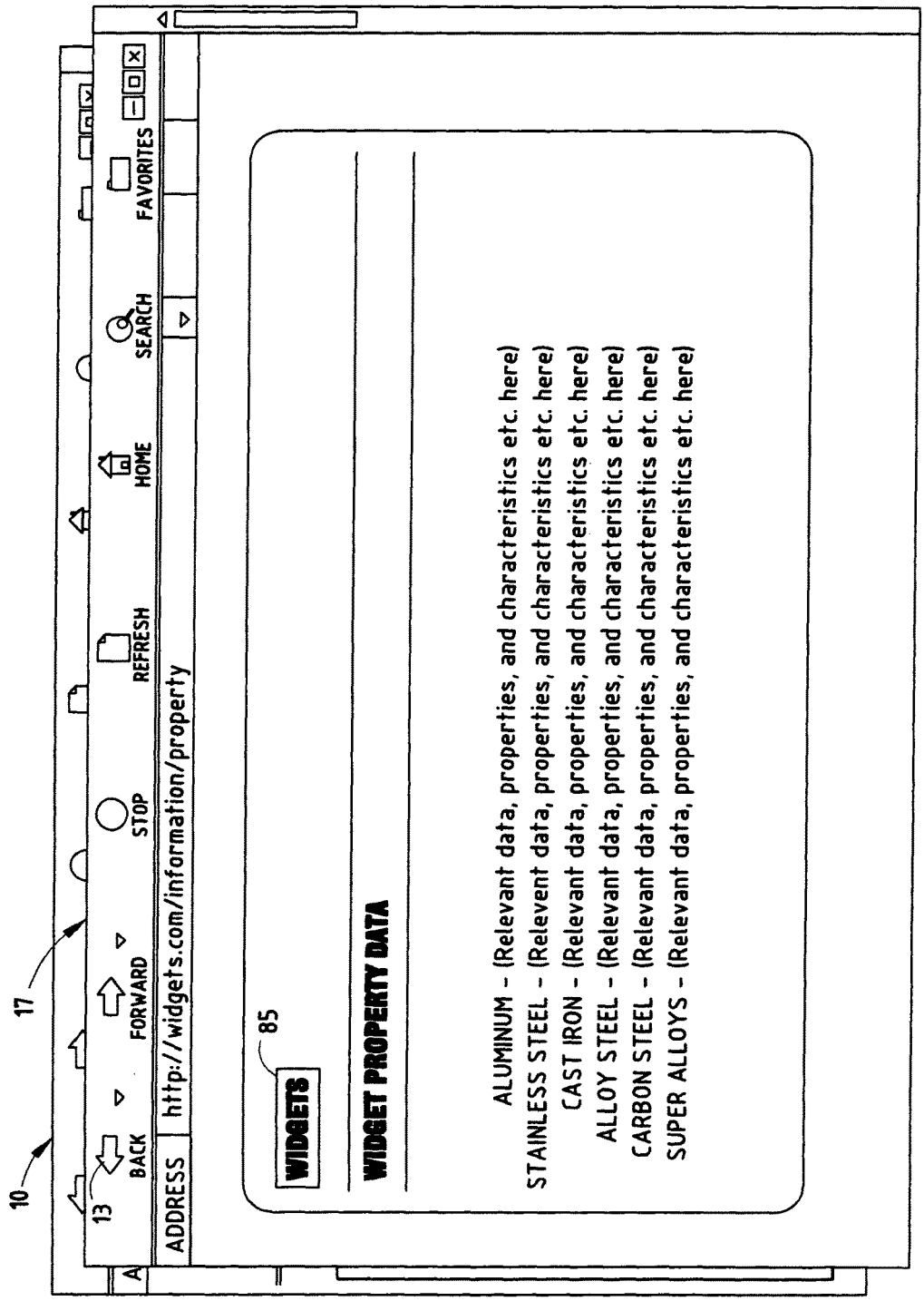
FIG. 9 shows a sample Web site of the embodiment described in FIG. 8 while the separate directory Internet browser window remains open.

The directory Web site 10, according to an embodiment the present invention, could additionally contain an information link 19 (see FIG. 5). The information link 19, when activated by the user, sends the user to an information Web page 80 (see FIG. 8). The information Web page 80 provides the user with links to Web sites, which disclose information relating to the particular good or service that is the subject of the directory Web site 10. For example, the user's activation of the informational link 19 ("Widgets Informational Page") sends the user to the information Web page 80 for widgets, as shown at FIG. 8. The information Web page 80 can be displayed in the same Internet browser window or a new Internet browser window. Additionally, it typically includes a title heading 68, which contains the name of the good or service that is the subject of the user's search, source headings 69, which describe the type of source of the additional information, embedded reference links 70a, 70b, 70c, 70d, 70e, 70f to Web page(s) containing information about the good or service that is the subject of the user's search that may be of interest to the user. If the user activates any one of the embedded reference links 70a, 70b, 70c, 70d, 70e, 70f, then a separate Internet browser window could appear, as shown in FIG. 9. A separate Internet browser window allows the user to navigate through the linked Web page(s) displaying the additional information corresponding to the selected embedded reference links 70a, 70b, 70c, 70d, 70e, 70f while easily returning to the informational Web page 80 by simply closing the new Internet browser window or selecting a still active information Web page 80. Alternatively, if the user activates any one of the embedded reference links 70a, 70b, 70c, 70d, 70e, 70f, then typically the same Internet browser window replaces the information Web page 80 with the selected Web page. The linked further information Web page 17, as shown in FIG. 9, could contain a return link 85, which, when activated by the user, returns the user to the directory Web site 10. The information Web page 80 could provide further links to other Web pages via a scrollbar 67 that could list Web sites, supplier links, or any other link that could be of interest to the user, as shown in FIG. 8. The information Web site 80 could include a search function 66, whereby a user could input a search term. The search function 66 then searches for the queried search term. Alternatively, the information shown on the information Web site can be displayed to the user on the directory Web site itself along with the other components of the directory Web site. Typically, when this is done, the information or a portion of the information from the information Web site is displayed to the user of the directory Web site at the bottom of the directory Web site.

A master information Web page (not depicted) containing a link to the individual information Web page 80 for each the particular good or service that is the subject of the plurality of directory Web sites 6a, 6b, 6c, 6d could be utilized as another way a user could locate and enter a particular directory Web site 10. A user could visit the master information Web page and select an individual information Web page 80 for a specific good or service. That individual information Web page 80 then contains a link to at least one directory Web site 10 for a particular good or service, thereby allowing the user to reach eventually the directory Web site 10 for the particular good or service of the user's choice. Applicant believes this interlinking of Web sites increases the likelihood a conventional search engine will list a directory Web site 10 near the top of the results provided in response to a user's search query.

The present invention could relate to any good or service. While the present invention is primarily to be used in connection with offering industrial goods or services, any goods or services including goods or services such as, art dealers, toys, antiques, etc., could be indexed according to the present invention as well. A directory Web site 10 could list any number of suppliers 18a, 18b, 18c, 18d, 18e, 18f, including a single supplier. However, a directory Web site 10 preferably includes multiple suppliers 18a, 18b, 18c, 18d, 18e, 18f. A directory Web site typically categorizes the suppliers 18a, 18b, 18c, 18d, 18e, 18f into sets, the particular number of suppliers 18a, 18b, 18c, 18d, 18e, 18f being sufficient for a user to view all suppliers 18a, 18b, 18c, 18d, 18e, 18f in a given set and the corresponding rollover window 22, which is typically fixedly located on the directory Web site, without having to scroll the window up or down. As discussed above, the names of the suppliers 18a, 18b, 18c, 18d, 18e, 18f, are typically embedded with the particular supplier's Web site link 18. When a user places the cursor over a particular supplier's Web site link 18 and/or proximate the link and/or the supplier descriptive portion, a rollover window display area 22 displays an advertisement for the particular supplier. For example, if a user that rolls the cursor over or proximate the company name "AAA, Inc.," then the rollover window display area 22 would display an advertisement for AAA, Inc. The rollover window display area 22 communicates more detailed information to the user regarding the specific supplier of the good or service of the directory Web site 10, without the user having to activate the link and wait for a new internet page to load into their Internet browser. In addition to or as an alternative of an advertisement, the more detailed information could include the supplier's logo and contact information.

The rollover window display area 22 can be any size that is suitable to convey information about the supplier and could optionally have a border. The rollover window display area 22 could be programmed to communicate such information using a script language such as, JAVA®, JAVASCRIPT®, FLASH® or other similar computer programming language of script. The rollover window display area 22 can additionally communicate information in the forms of streaming video and audio. The rollover window display area 22 is preferably located on the directory Web site 10 such that a user could readily view the rollover window display area 22 when the user places the cursor at least substantially adjacent to or over a particular supplier's Web site link 18 or the description for the various suppliers 20*a*, 20*b*, 20*c*, 20*d*, 20*e*, 20*f*. If the directory Web site 10 lists numerous suppliers, then the directory Web site 10 could utilize more than one rollover window display area 22 so that the user can readily view a rollover window display area 22 whenever the user places the cursor over any of the description for the various suppliers 20*a*, 20*b*, 20*c*, 20*d*, 20*e*, 20*f* or corresponding particular supplier's Web site link 18. The roll over window(s) are typically stationary on the directory Web site. The corresponding rollover window display area 22 may communicate information about at least one supplier of the various suppliers 18*a*, 18*b*, 18*c*, 18*d*, 18*e*, 18*f*, automatically, that is even when the user has not moved the cursor over a particular supplier's Web site link 18 or description for the various suppliers 20*a*, 20*b*, 20*c*, 20*d*, 20*e*, 20*f*. The master Web site 4 can also utilize one or more of the rollover window display area 22.

Figure 6:
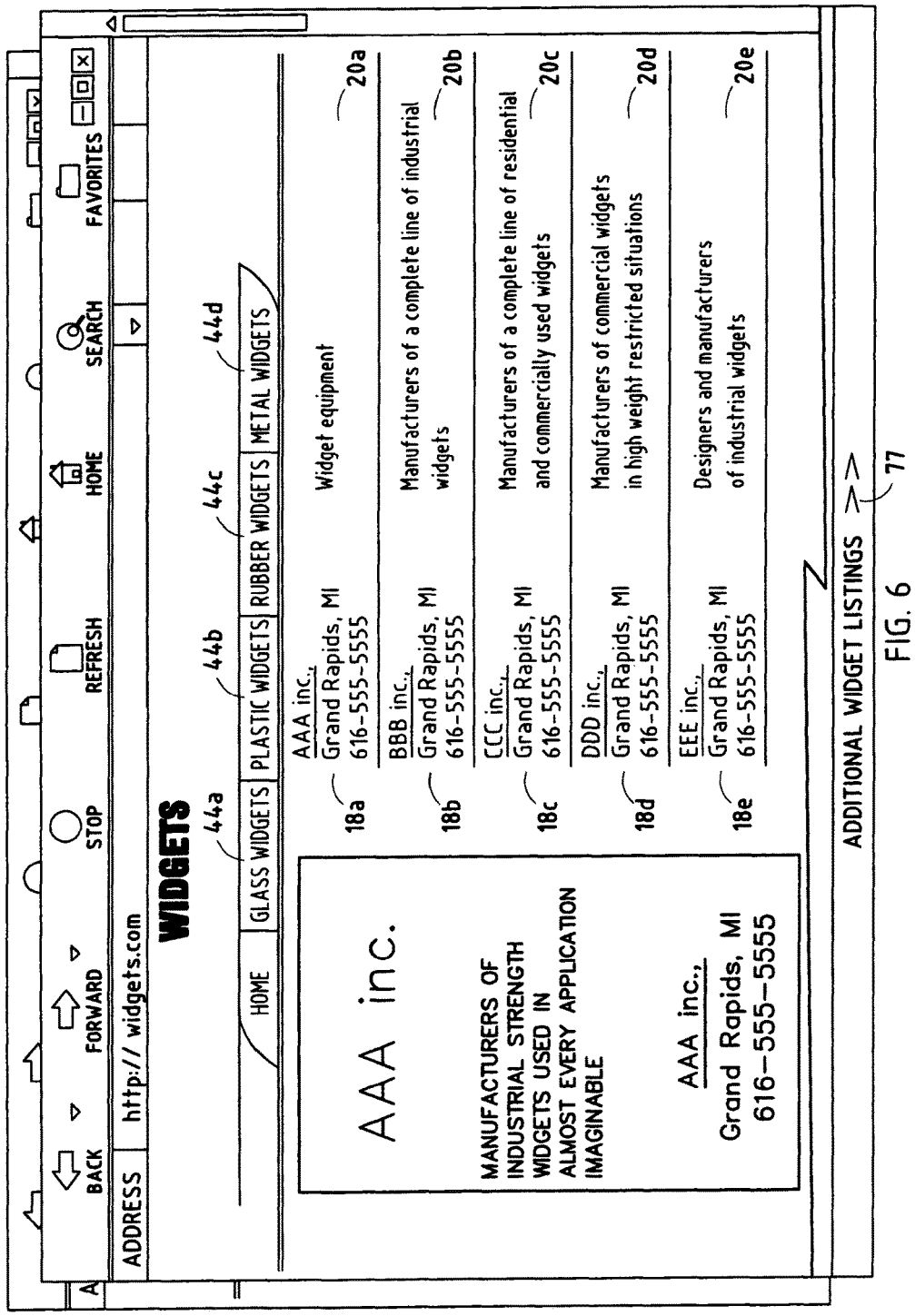
FIG. 6 shows another embodiment of a directory Web site, here for "widgets," with links to other directory Web sites for goods, which are considered to be species of the good "widgets"
Figure 7:
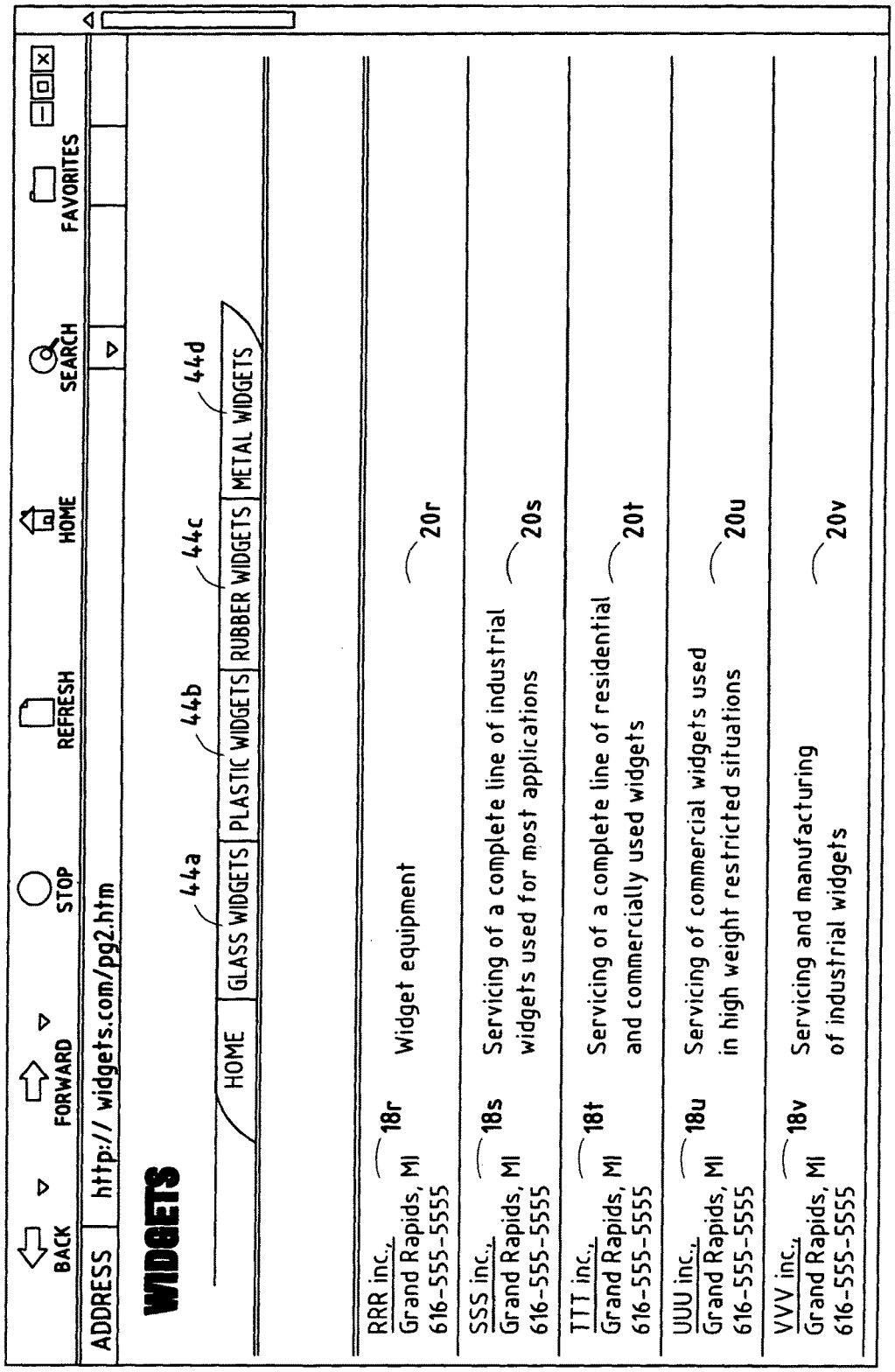
FIG. 7 shows another embodiment of a directory Web site, which does not display a rollover window for a pictorial advertisement.

The directory Web site 10 could tier the various suppliers 18*a*, 18*b*, 18*c*, 18*d*, 18*e*, 18*f*. If the directory Web site 10 is so tiered, then a first tier of various suppliers 18*a*, 18*b*, 18*c*, 18*d*, 18*e*, 18*f* is viewable when the Internet browser window initially displays the directory Web site 10. Any number of lower tiers of various suppliers 18*a*, 18*b*, 18*c*, 18*d*, 18*e*, 18*f* extends further down the directory Web site 10 and the user may view the lower tiers by scrolling down the directory Web site 10. Applicant presently prefers to use a three-tier system. For the first tier, the rollover window display area 22 is typically larger than the rollover window display area for subsequent lower tiers further down the directory Web site 10. Therefore, advertising space in the first tier costs a premium because the various suppliers 18*a*, 18*b*, 18*c*, 18*d*, 18*e*, 18*f* in the first tier are initially displayed to the user when the user accesses the directory Web site 20 and the rollover window display area 22 is typically larger in the first tier. Optionally, the directory Web site 10 contains a link to an additional listing of suppliers 77 (see FIG. 6), which, when the user activates the link using a user interface device such as a keyboard or modem, the directory Web site 10 directs the user to an additional listing of various suppliers 18*r*, 18*s*, 18*t*, 18*u*, 18*v*, as FIG. 7 shows. The directory Web site 10, when providing an additional listing of various suppliers 18*r*, 18*s*, 18*t*, 18*u*, 18*v*, typically does not utilize a rollover window but can do so. Consequently, if the directory Web site 10 displays an additional listing of various suppliers 18*r*, 18*s*, 18*t*, 18*u*, 18*v*, then the cost to advertise is usually more economical, but the location on the directory Web site is such that the supplier is not the first supplier viewed by the user. If the various suppliers 18*a*, 18*b*, 18*c*, 18*d*, 18*e*, 18*f* are numbered too many, then the directory Web site 10 will take too long to load and some users will not wait until the information is displayed. Therefore, the link to an additional listing of suppliers 77 to subsequent pages of the directory Web site 10 may be used and the links to an additional listing of suppliers are useful to add still further suppliers 18*r*, 18*s*, 18*t*, 18*u*, 18*v* without slowing page-loading time.

Optionally, in addition to the elements described above, a directory Web site 10 constructed according to the present invention may include the name of the particular good or service that is the subject of the directory Web site 10 in the metatags of the directory Web site 10. In addition, the metatags could attempt to include all anticipated terms that a user would use to search for suppliers of a particular good or service. The use of metatags in such a way is a tool to increase the odds that a search engine that utilizes an algorithm, which takes into account metatags, will list the directory Web site 10 near the top of the results provided in response to the user's search query. The metatags may be present within, outside or both within and outside of the source code for the title portion of the directory Web site 10.

As seen in FIG. 2, the directory Web site 10 preferably contains a link to the master Web site 24 that, when activated by the user, directs the user to the master Web site 4. The link 24 allows a user who locates a directory using a conventional search engine to locate easily an additional directory Web site 10 that relates to another good and service via the master Web site 4. The master Web site 4 provides an overall index for the particular directory Web site 10 that relates to a particular good or service. As shown in FIG. 4, a master Web site 4 could include an informational link 55, which, when activated by the user, directs the user to a Web page that provides information or assistance that could be helpful to a user that occasionally or routinely seeks suppliers for a particular good or service or a variety of goods and services. For example, the informational link 55 on the master Web page could direct the user to a Web page having multiple links that provide for customer assistance and feedback, helpful search tips, resources and term definitions for the user, links to industry associations, and industrial articles, and links to online magazines relating to services or goods listed on the master Web site 4, trade resources, material property data information Web page(s), industry directories, or other links of general interest to a user that has used a directory Web site 10. Conceivably, the master Web site 4 or a directory Web site 10 could provide the links and information described in the preceding sentence but also may not due to space constraints. However, the master Web site 4 or a directory Web site 10 could feasibly provide some of the links described two sentences above that may prove more popular to users. Alternatively, the informational link 55 could direct the user to a Web page (not shown) having multiple links further organized by categories of the services and goods, wherein the activation of one of the links would then direct the user to a Web page containing further links that provide for customer assistance and feedback, helpful search tips, resources and term definitions for the user, or industry associations and articles relating to services or goods found on the homepage relating to the particular category of goods or services.

As discussed above, a directory Web site 10 for a particular good or service can contain one or more links to one or more directory Web site 10 for another particular good or service or sub-category of good or service; or one or more Web sites providing general information about the particular good or service that is the subject of the directory Web site 10, trade associations relevant to the good or service of the directory Web site, etc. The initial directory Web site 10 is the directory Web site 10 initially accessed by the user. When the initial directory Web site 10 for a particular good or service contains a link to a directory Web site 10 for another good or service or sub-category of the good or service of the initial directory Web site, the link or links are typically positioned predominantly at the top of the initial directory Web site 10 either in the form of tabs or a list of related links. The predominant position provides notice of another directory Web site 10 that may be of interest to the user. The other directory Web site(s) 10 typically (a) relate to a similar good or service as the directory Web site 10 from which it is linked; (b) has been frequently visited by users of the directory Web site 10 from which it is linked; or (c) are directed toward a sub-category of goods or services such as automotive parts washers may be a sub-category of parts washers.

As discussed above, if a directory Web site 10 for a particular good or service, which good or service is a genus for a narrower species of goods or services, then it is advantageous to implement an additional directory Web site 10 for each of the narrower specie of goods or services. Similarly, if a directory Web site 10 for a particular good or service that is related in some way to other goods or services, then it is advantageous to implement an additional directory Web site 10 for each of the related good or service. For example, referring to FIG. 6, the directory Web site 10 relates to widgets (a hypothetical good). Narrower species of widgets could include the glass widgets, plastic widgets, rubber widgets, and metal widgets. The directory Web site 10 of FIG. 6 for widgets then could include a link to the directory Web site 10 that relates to the particular species of widgets, i.e., a link for the glass widgets directory Web site 10 at link 44a, a link for plastic widgets directory Web site 10 at link 44b, a link for rubber widgets directory Web site 10 at link 44c, and a link for metal widgets directory Web site 10 at link 44d. The user accesses the particular directory Web site 10 for the narrower specie of goods by activating the appropriate link. The links to the particular directory Web site 10 for the narrower specie of goods are typically configured as tabs, as shown in FIG. 6, across the top of the directory Web site 10 or as separate related links near the top of the directory Web site 10, as shown in FIG. 5, but could be displayed in any manner. The directory Web site 10 for a genus of goods or services that incorporates links to the directory Web site 10 for narrower species of goods or services could enhance the likelihood that a conventional search engine will list the directory Web site 10 for both the genus of the particular good or service and the directory Web site 10 for the species of particular goods or services. The enhancement of the likelihood could occur because the directory Web site for the specie of a particular good or service incorporates a more precise name of the good or service at issue, such as in the domain name 12, header 14, and text 16, among other places, as described above. In addition, the enhancement of the likelihood could occur because of the vertical integration of the directory Web site 10 for the specie of good or service within the directory Web site 10 for the genus of good or service to which the directory Web site 10 for the specie of good or service belongs. In alternative embodiments, the links 44a, 44b, 44c, and 44d, could be links to goods or services that are otherwise related to the good or service that is the subject of the directory Web site 10. That alternative embodiment would achieve the same enhancements, as described above.

Once the user locates a directory Web site 10 for a specific good or service via a conventional search engine or directly, if the user already knows the directory Web site 10, the particular layout of the general aspects of the present invention allows the user to search quickly and readily through the information contained on the directory Web site 10. For instance, as described above and shown in FIG. 2, the directory Web site 10 provides a rollover window display area 22, which provides the user with added information about a supplier when the user moves the cursor over the description of the supplier or the supplier's Web site link 18.

In addition, if the user activates a particular supplier's Web site link 18, then the particular supplier's Web site 30 appears as a separate internet browser window, as shown in FIG. 3 for company BBB inc. at http://BBB.com. The separate window allows the user to navigate through this particular supplier's Web site 30 but still be able to return easily to the directory Web site 10 by simply closing the window for the supplier's Web site 30 or using the cursor to select the still open separate Internet browser window for the directory Web site 10. The separate window arrangement eliminates the need for the user to press the "back" button 13 on the Internet browser to return to the directory Web site 10. Moreover, any number of such extra windows for a particular supplier's Web site 30 can be open at any one time such that the user may view the Web sites of many suppliers of a good or service at any given time. That aspect allows the user to narrow quickly and easily the particular supplier to which the user wishes to submit a communication. Moreover, because the supplier's Web site 30 appears within a separate Internet browser window, closing that window could automatically return the user to the Internet browser window that displays the directory Web site 10. That feature is unlike conventional search engines, which, if the user closes the browser displaying the supplier's Web site 30, then the user must open a new window and return to the search engine from whence the user started and thereafter re-enter the previous search strategy used.

The master Web site 4 as well as any particular directory Web site 10 can provide a search function 66. A database (not shown) contains a keyword list for each linked directory Web site 10. The keyword search function 66 references the keyword list for matching words. The directory Web site 10 that has the most matches is listed first. Any subsequent Web site directory 10 is typically listed in order of the next highest number of matches. When a user enters a phrase consisting of two words or more into the search function 66, the search function 66 references the keyword list for each word individually. Each keyword match to a directory Web site 10 is typically counted. Similar to a single word search, the directory Web site 10 that has the highest count of matches is listed first and each subsequent directory Web site 10 is listed in order of the next highest number of matches. The keyword search function 66 may optionally also provide an exact phrase match option. When a user chooses that option, the keyword search function 66 references the keyword list for the exact phrase as a whole rather than each word individually. The directory Web site 10 with the highest number of matches for the exact phrase is listed first. Any subsequent directory Web site 10 is listed in order of the next highest number of matches.

The directory Web site 10, according to the present invention, may also provide a location or regional search function. Typically, a supplier is assigned a location or region code in the database based on what zip code, state(s) or other region the supplier is located. The definition of the region or location is entirely customizable. The directory Web site 10 may provide a link to a Web site that displays a geographical map showing the divisional lines between selected regions. The geographical map may display any suitable location or region. When the user selects a particular location or region, the directory Web site 10, via a search function, references the database for all suppliers that have been assigned to that particular location or region. With reference to FIG. 4, the user could utilize the search function 66 by inputting a term that designates a location into the search function 66. The directory Web site 10 or master Web site 4 could then use the search term that the user inputted into the search function 66 to formulate a listing of the suppliers of the particular good or service that are located in the region or location or the supplier(s) located the closest to the region or location. The user can enter search terms such as any region, address, zip code, area code, or other data appropriate to an industry.

In another alternative format, the directory Web site 10 may provide the list of regions from which the user can select. The directory Web site 10 typically assigns each supplier to one or more of the regions, typically regions where the supplier does business or has a business presence. The regional search function references the database for the suppliers assigned to the desired region in the same manner as when an area map display is utilized. As discussed above, typically, when the results are displayed (they can be displayed in a separate "pop up" window or within the same browser window), suppliers paying the most for advertising are listed first to provide greater incentives to those advertisers. Typically, the regional search results lists suppliers from all tiers of the directory Web site 10.

Figure 10:
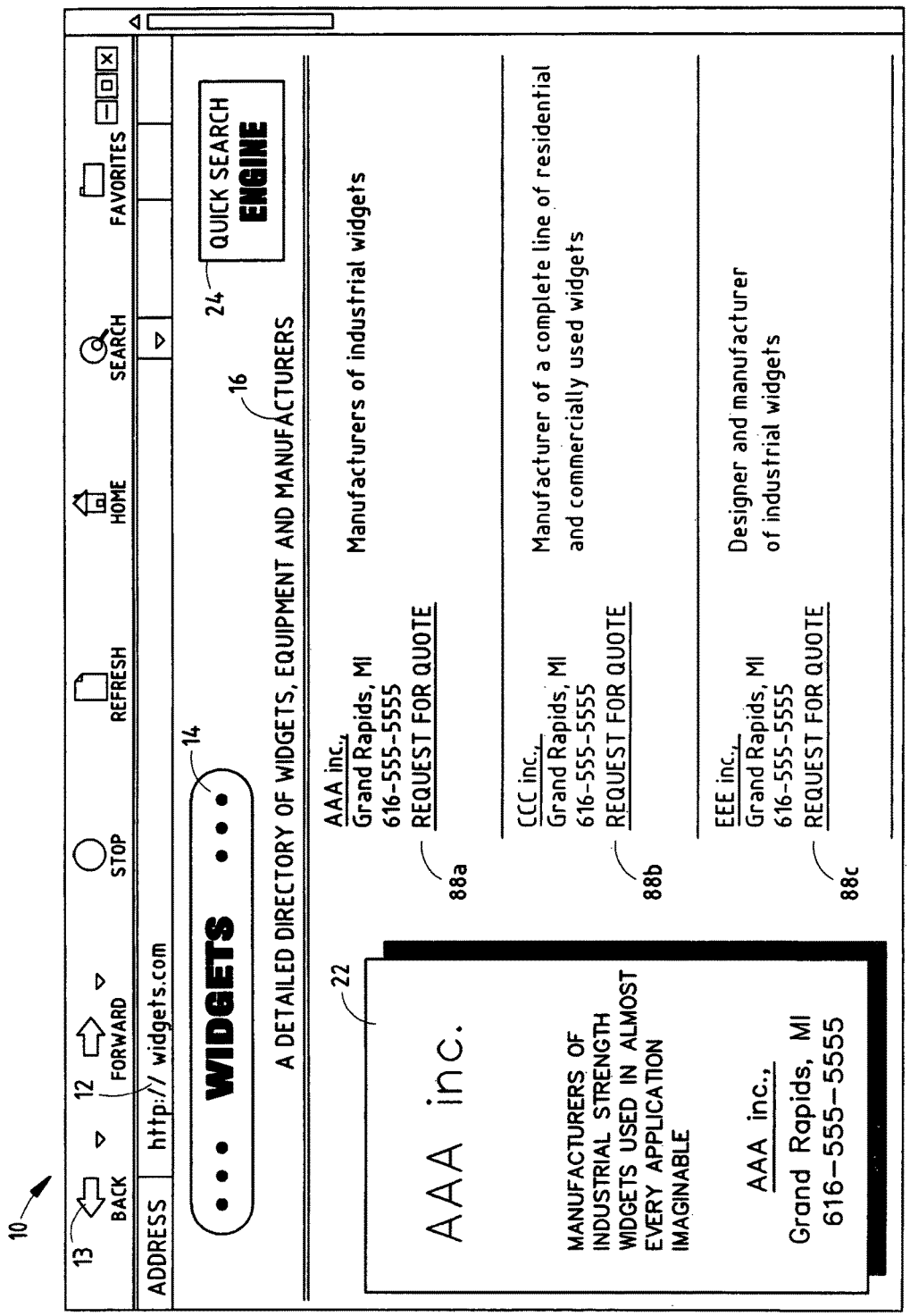
FIG. 10 shows another embodiment of a directory Web site, which provides a series of links to a Web page that enables the user to submit a communication, such as a request for a quotation, to one or more suppliers of the particular good or service.

As shown in FIG. 10, the directory Web site 10 may also include one or more communicate with supplier links 88a, 88b, 88c, which activates a supplier communication initiating Web site, typically in a separate browser window. A layout of the displayed page portion of the supplier communication initiating Web site is shown in FIG. 11. Preferably, the directory Web site 10 displays a plurality of the communicate with supplier links 88a, 88b, 88c; the directory Web site 10 usually displays one communicate with supplier links 88a, 88b, 88c, for each supplier listed therein, as FIG. 10 shows, but can additionally include another communication with supplier link not associated with a supplier. This link can be instead of or in addition to the communicate with supplier links associated with the suppliers. When such non-associated link is displayed/provided, it is typically positioned above the listing of suppliers.

Some benefits of the supplier communication initiating Web site 90 include providing a user with easily accessible communication to one or more suppliers of a particular good or service, saving time by eliminating the need for the user to have to search for each supplier's email address or contact information, saving time by allowing a user to send an email to multiple suppliers essentially simultaneously to gain information instead of having to separately send one email to each supplier. The supplier communication initiating Web site 90 essentially provides users with a "one stop shop" and allows a user to efficiently obtain information from multiple suppliers of a particular good or service.

Typically, the directory Web site 10 includes at least one communicate with supplier links 88a, 88b, 88c, to the supplier communication initiating Web site 90 located substantially adjacent to the particular supplier's Web site link 18. If the user activates the communicate with supplier links 88a, 88b, 88c, then the supplier communication initiating Web site 90 will appear either within the same browser window or in a separate browser window, which is preferred. The use of a separate browser window provides easier navigation for the user because once the user is done with one window; the user need only close the window to continue where the user left off with viewing or otherwise utilizing the other window displaying the directory Web site.

Referring to FIG. 11, the supplier communication initiating Web site 90 typically includes a supplier selector portion 92 and an information input portion 94. The supplier selector portion 92 allows a user to select one or more suppliers listed in the preceding directory Web site 10, typically to obtain more information from the selected suppliers. The supplier selector portion 92 typically comprises at least one descriptor of at least one of the suppliers from a directory Web site, such as the supplier's name, preferably descriptors of most of the suppliers from the preceding directory Web site 10, and more preferably descriptors for all of the suppliers listed in the preceding directory Web site 10. For example, a preferred embodiment is shown in FIG. 11, which shows descriptors for each of the suppliers that are depicted on the directory Web site 10 for air compressors shown in FIG. 12, which is the display of the directory Web site. Usually, the descriptors are the name of the supplier or an amount of the name sufficient to notify the user of the supplier identified by the descriptor.

In an embodiment where the directory Web site 10 is tiered as described above, the supplier selector portion 92 can display different options depending on the amount of tiers. For example, if there were two tiers for suppliers in the directory Web site 10, one embodiment of the supplier selector portion 92 may display only the first tier suppliers, whereas another embodiment of the supplier selector portion 92 would display both the first and the second tier suppliers.

The supplier selector portion 92 additionally typically includes a selection area 96 of the supplier selector portion typically located substantially adjacent to one or more supplier's names or supplier descriptive portions. More typically, a box of the selection area 96 is located substantially adjacent to each supplier's name. In an alternative embodiment, a supplier's Web site link 18 for each supplier is located substantially adjacent or proximate to the selection area 96, typically such that the supplier's Web site link 18 is readily understood by the user as linking to the particular supplier's Web site 30. Preferably, the selection area 96 will include a series of boxes, circles, or other shapes in which the user can enter an "x" or other type of check-mark so that it is apparent to the user that the user has selected one or more suppliers. However, selection of a supplier could conceivably be noted by bolding the supplier name or changing the font or color of the name or any other mechanism for designating to the user that the supplier has been selected or not. Additionally, preferably, when a particular communicate with supplier link such as 88a in FIG. 10 is selected, the displayed supplier communication initiating Web site will load and initially display the page with the box adjacent the supplier's name or other supplier indicator in the case an indicator for AAA, Inc. is already selected. This would correspondingly occur for each particular communicate with supplier link. Alternatively, when a particular communicate with supplier link is not associated with any particular supplier, obviously this pre-selection would not occur.

The information input portion 94 allows the user to submit a communication to the supplier(s) that the user has selected, directory Web site administrator, or other designated person or entity. The communication that the user has submitted via the information input portion 94 typically is information that enables further contact between the chosen supplier(s) and the user. Typically, the user inserts at least some of the following information into the information input portion 94: the user's name, address, home phone, cellular phone, business phone, email address, questions, and comments. The information input portion 94 may also comprise a pre-written comment selection 98 area, which may be located substantially adjacent to a pre-written question or comment 99. Preferably, the pre-written comment selection area 98 comprises a box, circle, or other shape in which the user can enter an "x" or other type of check-mark so that the supplier(s) can be supplied with further information regarding the user's needs, consent to be contacted, etc. This generates a statement in the generated electronic mail message to the supplier that the user would like to send the supplier an attachment file in a subsequent email. This is done so that the electronic mail message initially sent to the supplier is less likely to be blocked by spam or virus filtering software. Most often, especially in the case of suppliers of industrial components and machines, the specification and questions portion of the information input portion 94 is used by the user to request a price quotation on a certain product or products offered or possibly offered by the selected suppliers.

Typically, the data from the completed information input portion 94 will be sent and/or accessible to the supplier(s) that the user selected from the supplier selector portion 92. In an alternative embodiment, the information input portion 94 may allow the directory Web site 10 administrator to access the information inputted by the user to prevent unwanted spam or other solicitors from interfering with the object of the supplier communication initiating Web site 90. In a preferred embodiment, the information input portion 94 may require certain fields be inserted for the user to be able to request further information from one or more suppliers, such as the user's company name, contact name, contact telephone number, as shown in FIG. 11.

As discussed above, the supplier communication initiating Web site 90 may further comprise an automatic selection mechanism. The automatic selection mechanism provides automatic selection of one or more suppliers from the directory Web site 10 onto the supplier selector portion 92 of the supplier communication initiating Web site 90. The automatic selection mechanism is typically activated when communicate with supplier links 88*a*, 88*b*, 88*c*, which is typically located substantially adjacent to the supplier's Web site link 18 and typically corresponds to that supplier as shown in FIG. 12, is activated. Preferably, when a user selects the communicate with supplier links 88*a*, 88*b*, or 88*c*, the supplier communication initiating Web site 90 will activate with that particular supplier automatically selected in the supplier selector portion 92. This automatic selection mechanism provides increased convenience to the user by eliminating a "click", since it prevents a user from having to "click" on the link to the quote request Web site and then "click" again to select the supplier.

The supplier communication initiating Web site 90 may also include the preceding directory Web site 10 domain name or Internet address 12 and a header 14 that at least substantially includes the name of the good or service that is the subject of the directory Web site 10. In a preferred embodiment, the supplier communication initiating Web site 90 also includes a link to the preceding directory Web site 10, which enables the user to return quickly and easily to the preceding directory Web site 10. In another alternative embodiment, the supplier communication initiating Web site 90 may include other related links to one or more directory Web sites 10 for another good or service or sub-class of good or service.

Once the user has filed/completed the required and elected data field of the information input portion and selected the suppliers to communicate with via the supplier communication initiating Web site, the user activates the "send" or similarly designated activation link using the cursor and typically the computer mouse. Thereafter, as discussed above, an electronic mail message is essentially simultaneously sent to the designated suppliers. Usually, as will be apparent to one of ordinary skill, the email address is typically provided by accessing a database for the appropriate email address for a supplier in a similar fashion to the database fields of the region search and other search functions described above.

A computer hardware system may be used, in whole or in part, by a user to view the Internet Web sites discussed herein or otherwise to implement the various embodiments of the present invention. Generally, the computer system used by the user to access and interact with the Web site of the present invention typically includes at least an input/output device configured to receive input from a user and provide output to a user; a processor coupled to the input/output device; and a memory subsystem coupled to the processor, the memory subsystem coupled to the processor, the memory subsystem storing code that is responsive to input from the user that instructs the processor to perform steps based upon the user selections of links and data inputted using the Web sites as discussed herein.

More particularly, the computer hardware system typically includes a central processing unit (CPU); a random access memory (RAM); a read only memory (ROM); a display monitor; a display interface connected to display monitor; a data storage device; a first input/output (I/O) interface connected to data storage device; a keyboard; a second I/O interface connected to the keyboard or computer such as a computer mouse; an information receiving device connected to a third I/O interface; a printer; a printer interface connected to printer; and a system bus for interconnecting CPU, RAM, ROM, display interface, first I/O interface, second I/O interface, and printer interface. As described below, information receiver may take any appropriate form for receiving data from the particular form of machine-readable data used for the particular embodiment or for receiving machine-recognizable information that may be processed by a computer. Preferably, the data storage device is a computer hard disk drive. The user may use the computer hardware system to access the system of the present invention, which may be provided by an internet host server and made available through the Internet. The Web sites of the present invention, like most all Web sites, are typically stored on a server or other computer which is accessible over the Internet or the World Wide Web. Generally, a server is a computer that provides access to files via a computer network such as the Internet or a smaller Intranet.

The present invention additionally includes a method of doing business. The method of doing business comprises providing a Web site according to the invention described above that is engineered to permit a potential consumer of a particular good or service to locate easily and quickly a list of suppliers of the good or service.

As will be apparent to those of ordinary skill in, the art, the components of computer hardware system may be incorporated into a personal computer or a portable laptop computer, with the possible exception of information receiver and printer. However, as it is apparent from the description of the present invention, certain components of computer hardware system may be eliminated depending upon the manner in which it is used within the confines of the present invention. Typically, a user(s) utilizes a computer hardware system as a remote computer to communicate over a network, such as the Internet, typically a wide-area network (WAN), such that it couples, together a plurality of communication nodes or locations. Usually, the computer hardware system communicates with at least one server over the Internet.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

Example 1. The following is an example of an embodiment of the invention.

FIG. 13 displays a portion of the Web site http://www.industrialquicksearch.com as displayed within the Internet browser window. That Web site is an example of the master Web site 4 introduced and discussed above. That Web site displays numerous names of particular goods. In particular, there are four columns of names of goods: the first column starting with Air Compressors, then Air Cylinders, then Air Filters, on down to Clean Rooms; the second column starting with Electronic Connectors, then Electronic Enclosures, then EMI Shielding, down to Hinges; the third column starting with Industrial Ovens, then Industrial Parts Washers, then Industrial Scales, on down to Machine Vision Systems; the fourth and final column starting with Plastic Tubing, Pneumatic Conveyors, Powder Metal Parts, on down to Sound Proofing.

Each name of a particular good is typically underlined and additionally operates as a link to another website. "Air Compressors" is not just a name of a class of good but additionally has an embedded link to the directory Web site http://www.aircompressors.bz. "Air Cylinders" is not just a name of a class of good but additionally has an embedded link to the directory Web site http://www.air-cylinders.com. "Air Filters" is not just a name of a class of good but additionally has an embedded link to the directory Web site http://air-filters.org, and so on for every other name of good listed in the four columns. Activation of these links causes the display to show the corresponding directory Web site in the Internet browser window.

Figure 15:
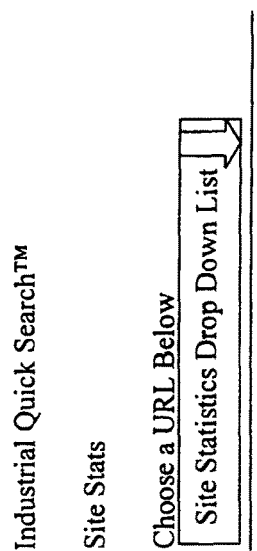
FIG. 15 shows an example Web page (browser omitted) that provides statistics for a directory Web site that the user selects using a drop down list.

Under the "Client Resources" heading on the master directory of Web sites, is the phrase "IQS® Client Stats Login." The phrase "IQS® Client Stats Login" additionally contains an embedded link a different page on the master Web site, specifically http://www.industrialquicksearch.com/statslogin.htm. When a user activates the link, such as by moving the cursor over the link and pressing the left button on the mouse, a new Internet Web browser window opens and shows the Web site http://www.industrialquicksearch.com/statslogin.htm, which is substantially depicted in FIG. 14. That Web site in turn, near the bottom, displays the phrase "IQS Site Statistics," which additionally contains an embedded link to the Web site http://www.industrialquicksearch.com/sitestats.htm. When a user activates the link, a new Internet Web browser window opens and shows the Web site http://www.industrialquicksearch.com/sitestats.htm, which is substantially depicted in FIG. 15. That Web site provides a drop down list directly below the phrase "Choose URL Below." The drop down list is titled "Site Statistics." That drop down list is an example of the drop down list 9 introduced above. When the user clicks on the downward arrow on the right edge of the Site Statistics drop down list, a list of names of goods drops down, which names of goods correspond with the names of goods within the four columns of the Web site http://www.industrialquicksearch.com, as described above. Each name of a good set forth in the drop down list is additionally an embedded link to a separate Web page that displays statistics about how many users have visited the corresponding Web site directory for that particular good in the drop down box. For example, when the user selects "aircompressors" from the drop down list, the browser displays the Web site http://www.industrialquicksearch.com/stat/statpage.php?url=aircompressors.bz. That Web site as displayed within the browser window is substantially illustrated at FIG. 16. The "aircompressors" selection option on the drop down list is an example of the ranking link 8 described above.

As discussed above, FIG. 13 displays a portion of the Internet Web site http://www.industrialquicksearch.com. As discussed above, that Web site displays numerous names of particular types or classes of goods. Each name of a particular good is underlined and additionally contains an embedded link to another Web site. "Powder Metal Parts" is not just a name of a good but additionally has an embedded link to the Web site http://www.powderedmetalparts.com. When a user moves the cursor and activates (i.e., "clicks") that link, a new browser window opens. That new browser window displays that Web site.

FIG. 17 substantially illustrates that Web site, http://www.powderedmetalparts.com as shown within the display portion of the Internet browser. The initial text of the Web site is a reiteration of the domain name, "www.powderedmetalparts.com". This is an example of a header 14 introduced above. Again, the domain name or a portion of the Internet address and the header incorporate the name of the good at issue; here, powdered metal parts. The written paragraph near the beginning of the Web site display in this Example is: "Powder Metal Parts. Powder Metal Parts Manufacturers. IQS Directory has the largest selection of powder metal parts and company information for powder metal parts manufacturers." That is an example of text 16 discussed above. The text incorporates the name of the good "powder metal parts" four times in that written paragraph, which is located near the beginning of the Web site display, typically within the header portion as shown. Near the bottom right of the Web site display is the underlined phrase "Powder Metal Parts Informational Page." That underlined phrase has an embedded link to the Web page http://www.powderedmetalparts.com/info/powderedmetalparts/. That link is an example of an information link 19 described above.

When the user "clicks" on or otherwise activates that link, the browser, in the existing window, displays that Web page, http://www.powderedmetalparts.com/info/powderedmetalparts/. FIGS. 18a, 18b, and 18c, which are meant to be understood as a printed version of one Web page display, substantially illustrate that Web page. That Web page is an example of an information Web page 80, introduced above. The Web page provides information, among other things, about powdered metal parts. The name of the good, powdered metal parts, is used throughout the Web page. The Web page provides the name of the directory Web site from whence it came, powderedmetalparts.com in the header, which is an example of a title heading 68, introduced above. The Web page provides headings to foreshadow the information provided afterwards. For example, the heading "About Powdered Metal Parts," informs the user that the paragraphs that follow regard powdered metal parts. That heading is an example of the source headings 69. The other source headings on the Web page are "Featured Articles" and "Types." On the left side of the Web page, in the column titled "Information Page Links:," are a variety of underlined phrases. Each of the underlined phrases, such as "Trade Shows," has an embedded link to another Web page, which provides further information about a topic in accordance with the underlined phrase. So, for the case of "Trade Shows," when a user "clicks" or otherwise activates the link embedded in the underlined phrase "Trade Shows," the same browser window displays the Web page http://www.powderedmetalparts.com/info/powderedmetalparts/trade.htm. FIG. 19 substantially displays that Web page. That Web page is an example of a linked further information Web page 17, introduced above. The link embedded in "Trade Show" is an example of one of the embedded reference links 70a, 70b, 70c, 70d, 70e, 70f.

Returning to the directory Web site illustrated by FIG. 17, that directory Web site for the good, powdered metal parts, provides a list of three suppliers of powdered metal parts. The three listed suppliers of powdered metal parts are named: ASCO Sintering, Saint Marys Pressed Metal, Inc., and Webster-Hoff Corporation. This listing of those three suppliers is an example of various suppliers 18a, 18b, 18c, etc., introduced above. A typical directory Web site 10 that contains a roll-over window could list more than three suppliers on a given page, such as six suppliers. The name of the supplier is typically underlined. That is so because the name of the supplier additionally contains an embedded link to the supplier's Web site. The link to the supplier's Web site is embedded in the underlined name of the supplier. For example, the supplier "ASCO Sintering" is underlined and has an embedded link to the supplier's Web site, which is http://www.ascosintering.com/. That is an example of a supplier's Web site link 18, introduced above.

The directory Web site for powdered metal parts, illustrated by FIG. 17, additionally lists "Additional powder-metal-parts Listings—Page 2" near the bottom of the Web page. That phrase is underlined. That phrase is embedded with a link to another Web page. That Web page is http://www.powderedmetalparts.com/pagetwoads.aspx. When a user "clicks" or otherwise activates the link to that Web page, the browser displays that Web page in the same window. FIGS. 20a, 20b, 20c, and 20d substantially illustrate that Web page. That Web page provides a list of the names of numerous additional suppliers of the good at issue, namely powdered metal parts. Those names of numerous additional suppliers were not listed on the preceding Web page, i.e., the directory Web site http://www.powderedmetalparts.com of FIG. 17. Those names of numerous additional suppliers, such as AMKAD Metal Components, Advanced Power Products, Inc., etc., are examples of an additional listing of various suppliers 18r, 18s, 18t, 18u, 18v, etc., introduced above. The link embedded into the phrase "Additional powder-metal-parts Listings—Page 2" is an example of a link to an additional listing of suppliers 77, introduced above.

Referring to the Web page that FIG. 20 illustrates, the near top left of the Web page states the underlined phrase "Back to powder-metal-parts-Page 1." Embedded into that phrase is a link back to the initial page of the Web site directory, http://www.powderedmetalparts.com/. That embedded link is an example of a return link 85, introduced above.

Referring back to FIG. 17, which illustrates a directory Web site for powdered metal parts, in addition to the name of the supplier, the directory Web site provides a description for each supplier. For example, referring to the supplier named ASCO Sintering, the directory Web site provides the following written description: "ASCO Sintering has been a leader in the manufacture of small powdered metal parts, powdered metal gears and sintered metal parts for many years. Serving several Fortune 500 companies in the automotive, electronics and hardware industries. We are an employee-owned company!" The directory Web site provides a similar written description for each company listed. Those descriptions are examples of the description for the various suppliers 20a, 20b, 20c, 20d, 20e, 20f, which were introduced above.

In addition, as FIG. 17 illustrates, the directory Web site for the good powdered metal parts provides an outlined area to the left of the names of the companies listed. The rollover window display area, as illustrated, provides an advertisement for the company named Webster-Hoff Corporation. Although FIG. 17's illustration is text, the reader should understand that the advertisement, as discussed above, may be a photographic advertisement or pictorial marketing material or other display. If the user moves the cursor over or proximate the name of the company, in this instance Webster-Hoff Corporation, the advertisement for Webster-Hoff Corporation appears in the rollover window display area. The advertisement for Webster-Hoff Corporation will remain apparent in the rollover window display area until the user moves the cursor over the name of another listed supplier. For example, if the user then moves the cursor over or proximate the name of the supplier ASCO Sintering, then the rollover window display area will stop displaying the advertisement for Webster-Hoff Corporation and, instead, will display the advertisement for ASCO Sintering. FIG. 17's illustration of the rollover window display area is an example of a rollover window display area 22, which was introduced above.

In addition, as FIG. 17 illustrates, the directory Web site for the class of good powdered metal parts provides, at the bottom right of the Web page, the underlined phrase "Industrial Quick Search, Inc." That underlined phrase is embedded with a link to the Internet Web site http://www.industrialquicksearch.com (illustrated in FIG. 13), which was an example of the master Web site 4 described above. That embedded link is an example of the master Web site link 24, introduced above.

Referring to FIG. 17, if the user clicks or otherwise activates the link to the supplier's Web site, which link is embedded in the underlined name of the supplier, the browser will open a new window. The new window will display the supplier's Web site. For example, the supplier "ASCO Sintering" is underlined and has an embedded link to the supplier's Web site, which is http://www.ascosintering.com/. If the user clicks the link to ASCO Sintering's website, then the browser opens a new window, which then displays ASCO' Sintering's website——http://www.ascosintering.com/.

Referring to FIG. 17, the directory Web site for the good, powdered metal parts, provides, near the top right of the Web page, five underlined phrases. Those underlined phrases are: "die-castings," "metal-stampings," "cold-headed-parts," "forgings," and "screw-machine-products." Those phrases are descriptions of goods. Those goods are related to powdered metal parts, which is the subject of the directory Web site illustrated at FIG. 17. A user of the directory Web site, who is seeking a supplier for powdered metal parts, could also be seeking a supplier for related goods such as die-castings, metal-stampings, cold-headed-parts, forgings, and screw-machines, which are all goods that are listed in the top right of the Web page. Embedded within each underlined phrase (name of the particular related good) is a link to the directory Web site that will list suppliers for that particular related good. For example, if the user activates the link for die-castings, the browser will display (in the same window) the directory Web site for die-castings, i.e., http://www.die-castings.net/. Those links to the directory Web sites for goods related to powdered metal parts, such as "die-castings," is an example of the links 44*a*, 44*b*, 44*c*, 44*d*, introduced above.

Referring to FIG. 13, which is the illustration of http://www.industrialquicksearch.com; the master directory of Web sites, near the bottom of the Web page, are the phrases "List Your Company" and "Terms and Conditions." The phrases are embedded with a link to a different Web page. For example, if the user activates the link embedded with "List Your Company," then the browser opens a new window and displays the Web page http://www.industrialquicksearch.com/suggest.htm. That Web page, which is not illustrated, provides information on how a supplier of a particular good or service, can purchase the privilege of having a directory Web site for a particular good or service list that supplier as a supplier on a directory Web site. Similarly, if the user activates the link embedded with "Terms and Conditions," then the browser opens a new window and displays in the same window the Web page http://www.industrialquicksearch.com/terms.htm. That Web page, which is not illustrated, provides the terms and conditions of exercising the privilege of using the Web page to search for and to submit a communication to a supplier of a good or service. Those links embedded with "List Your Company" and "Terms and Conditions" are examples of an informational link 55, introduced above.

Referring to FIG. 13, near the top of the Web page there is the phrase "IQS Search." That phrase is located adjacent to a user entry box, which is labeled "Insert Search Here." That user entry box is located adjacent to a search activation button, which is titled "Search Button." A user visiting the master directory of Web sites, http://www.industrialquicksearch.com, can use the user entry box, enter a search term, and activate the search by pressing the search activation button to search every directory Web site simultaneously for that specific search term. For example, a user visiting the master Web site, http://www.industrialquicksearch.com could be in need of a supplier that has experience with high-magnetic-response aluminum. The master Web site, http://www.industrialquicksearch.com, does not provide an already made directory Web site for the specific good or service "high-magnetic-response aluminum." Nevertheless, the user could enter the search term "high-magnetic-response aluminum" into the user entry box, which is labeled in FIG. 13 as "Insert Search Here" and activate the search by pressing the "Search Button." A search is then performed, which could be powered by Google Search Appliance, of every directory Web site for all goods and services for the phrase "high-magnetic-response aluminum." The browser then opens the Web page (in the same browser) that provides the results of the search. That Web page is illustrated at FIG. 21. That Web page informs the user that a supplier that has experience with high-magnetic-response aluminum is listed on the Web site directory for powdered metal parts, http://www.powderedmetalparts.com/. That Web site directory is illustrated at FIG. 17. The user can then click on the underlined wording under the relatively large font "Search". If the user so clicks, then the browser (in the same window) displays the Web site directory for powdered metal parts, http://www.powderedmetalparts.com/. As illustrated at Figure, the user can then read the description for the supplier named Webster-Hoff Corporation to discover that that supplier has experience with high-magnetic-response aluminum. The ability to search every Web site directory for every good and service via the master Web site http://www.industrialquicksearch.com is an example of a search function 66, introduced above.

Referring to the directory Web site illustrated by FIG. 17, the underlined phrase "Request for Quote" appears underneath the name of every listed supplier. The underlined phrase is embedded with a link to another Web site. If the user desires to request a quote or otherwise submit a communication to one of the suppliers, ASCO Sintering, for example, the user clicks on the underlined phrase or otherwise activates the link. The link embedded into the underlined phrase is an example of a communicate with supplier links 88*a*, 88*b*, 88*c*. As a consequence of the activation, the browser opens a new window, which displays for the user the Web site http://www.powderedmetalparts.com/RFQ/iqsm_rfq.aspx?catid=146&cold=55400. FIG. 22 substantially illustrates that Web site. The Web site illustrated in FIG. 22 is an example of a supplier communication initiating Web site 90, introduced above. Then, the user can select any additional supplier to which to send a communication or request for quote. The user can so select by selecting using the cursor and "click" to check the box next to the particular supplier's name. The selection area is on the left side of the Web site illustrated in FIG. 22, under "Step One" and "Select Company Name." The boxes enable selection of a supplier according to this embodiment, introduced above. In this example, the supplier communication initiating Web site had pre-selected ASCO Sintering as a selected supplier because the user had activated the "Request for Quote" link located under the company name ASCO Sintering. Alternatively, if the user had activated the "Request for Quote" link located under the company name of a different supplier, such as Webster-Hoff Corporation, then the supplier communication initiating Web site illustrated in FIG. 22 would have pre-selected only Webster-Hoff (and not ASCO Sintering) as a selected supplier to whom the user would submit a communication. The area under "Step One," which provides the user with the list of suppliers to whom the user will submit a communication is an example of a selection area 96, introduced above. To submit a communication to a supplier or request a quote from a supplier, the user must first enter various contact information, such as the user's company name, contact e-mail, etc., in the box under the appropriate query. The user can then check a box to indicate that the user "would like these companies to contact me about sending an attachment." That box is an example of a pre-written comment selection 98, introduced above. The associated text adjacent to the box is an example of a pre-written question or comment 99, introduced above. The user can type into the box under "Step Three:" any additional information that the user would like to communicate to the chosen supplier(s). If the user found his selection of suppliers under Step One and entries under Step Two and Step Three acceptable, then the user could use the cursor and mouse to press the "Send" button. If the user did not find those selections or entries acceptable, then the user could press the "Reset" button. If the user presses the "Reset" button, the browser deletes any entries that the user had made under Step Two and Step Three but typically does not unselect any supplier that the user had selected in Step One. The area including the areas under Step Two and Step Three, where the user can enter text, is an example of an information input portion 94, introduced above.

If the user does in fact press the "Send" button, the Web site sends the data, typically in a predetermined auto-generated form, to the chosen suppliers via electronic mail. Each supplier has previously submitted the supplier's electronic mail address to the directory Web site. FIG. 23 illustrates a sample electronic mail from the user to the selected supplier ASCO Sintering.

In this example, the Web site has successfully enabled a potential consumer to submit a communication to a supplier.

Figure 26B:
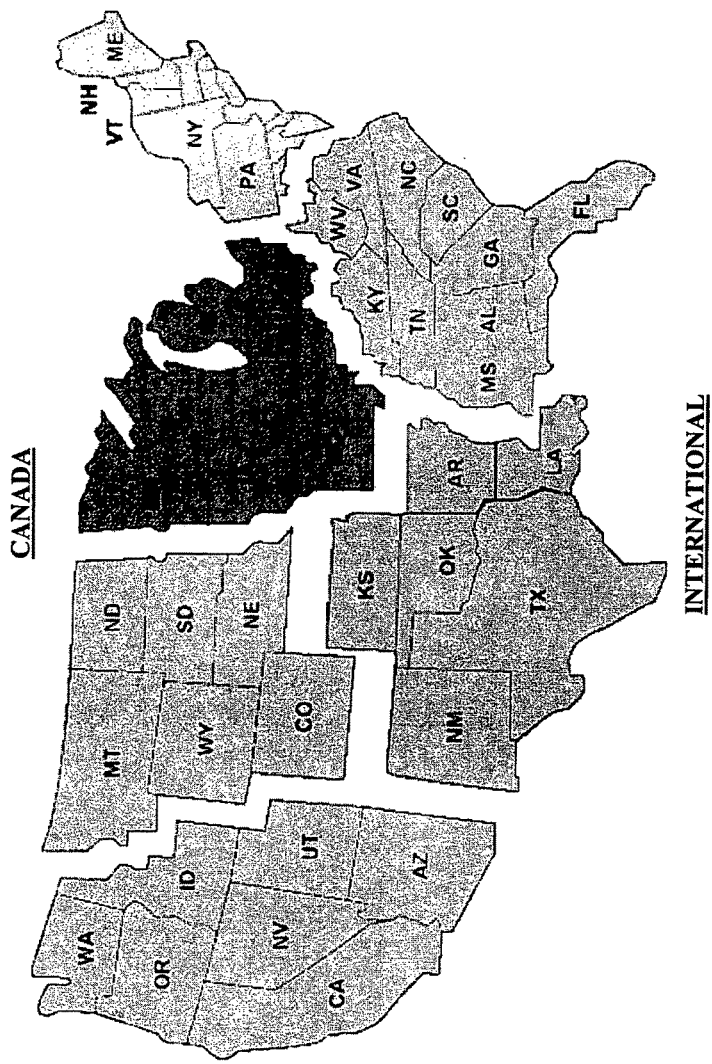

Example 2. This is an example of an alternative embodiment of the present invention. In this example, the master Web site is a dynamic Web site. The master Web site, in this Example, is http://www.iqsdirectory.com. FIGS. 24*a* through 24*c* illustrate a print-off of that master Web site. That Web site lists the names of numerous goods. The names of the goods are underlined. Each underlined name of a good is embedded with a link to a different Web page within the same Web site http://www.iqsdirectory.com. As discussed above, at least a portion of the Internet address for each of the linked Web pages contains the name or descriptor of the good or service listed. For example, for the good "Parts Washers," the master directory Web site provides a link to the Web page http://www.iqsdirectory.com/parts-washers/, which is the directory Web site for parts washers. "Parts Washers" forms part of the Internet address as "parts-washers." FIGS. 25*a* through 25*j* illustrate a print-off of the directory Web site for parts washers, http://www.iqsdirectory.com/parts-washers. That directory Web site utilizes more than one rollover window display area on the same Web page. That directory Web site additionally includes the further information on the same Web page as the list of suppliers. That directory Web site additionally provides the underlined text "Regional Search," which is embedded with a link to a Web page (http://www.iqsdirectory.com/Region-Search.aspx?CatID=92) that permits the user to narrow the listed suppliers by geographic region. FIGS. 26*a* and 26*b* illustrate that Web page where the user can select suppliers by geographic region. Referring back to FIG. 25, if the user presses the "Request for Quote" button, then the Web browser opens a new window. That new window displays the supplier communication initiating Web site, as described and illustrated in this Example. Of course, the listed suppliers will match the suppliers of the particular good, in this instance, parts washers. Additionally, the directory Web site of FIGS. 25*a*-25*j* contains the information that could optionally be included on a linked to information page at the bottom of the Web site instead.

A potential consumer searching for "parts washers" via a conventional search engine such as GOOGLE® will likely find the directory Web site for parts washers, http://www.iqsdirectory.com/parts-washers, highly ranked. Applicant believes that the placement of all of the directory Web sites under the domain name of the same master Web site http://www.iqsdirectory.com presently facilitates higher ranking by some search engines, such as the GOOGLE® search engine.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The invention claimed is:

1. A computer system for facilitating communications between suppliers and consumers over the Internet and comprising a computer having non-transitory memory for storing machine instructions that are to be executed by the computer, the machine instructions when executed by the computer implement the following functions:

generating a supplier communication Web site comprising a plurality of links to directory Web sites, wherein the supplier communication Web site is accessible over the Internet;

generating a directory Web site in response to activation of a link to a directory Web site, wherein the directory Web site is associated with a particular class of goods or services and comprises:
a plurality of links to supplier Web sites;
a plurality of supplier descriptive portions, wherein each supplier descriptive portion is substantially adjacent a link to a supplier Web site; and
a supplier communication link;

generating a communication initiating Web site in response to activation of the supplier communication link, wherein the communication initiating Web site comprises:
a supplier selector portion that includes a plurality of supplier names and a plurality of selection elements, wherein each selection element is substantially adjacent a supplier name;
an input portion that includes a plurality of fillable information fields for receiving consumer information data; and
an activation link;

receiving consumer information data input into one or more of the plurality of fillable information fields of the communication initiating Web site;

determining a set of two or more suppliers in response to a consumer's interactions with the communication initiating Web site;

generating one or more supplier communication messages in response to a consumer's interactions with the communication initiating Web site; and delivering via a computer network the one or more supplier communication messages.

2. The computer system of claim 1, wherein the machine instructions when executed by the computer further implement the following functions:
selecting one or more suppliers in response to a consumer's interactions with the directory Web site; and
generating the plurality of supplier names and the plurality of selection elements included in the supplier selector portion of the communication initiating Web site based on the selection of one or more suppliers.

3. The computer system of claim 1, wherein the machine instructions when executed by the computer further implement the following functions:
receiving an electronic file submitted by a consumer;
storing the electronic file; and
delivering via a computer network the electronic file.

4. The computer system of claim 1, wherein the one or more supplier communication messages comprise consumer information data input into one or more of the plurality of fillable information fields of the communication initiating Web site.

5. The computer system of claim 1, wherein the directory Web site further comprises a plurality of selection elements, wherein each selection element is substantially adjacent a link to a supplier Web site.

6. The computer system of claim 1, wherein the directory Web site further comprises a title portion that is descriptive of the particular class of goods or services.

7. The computer system of claim 1, wherein the machine instructions when executed by the computer implement the further function of generating a second directory Web site in response to activation of a link to a second directory Web site, wherein the second directory Web site is associated with a second class of goods or services.

8. A computer-implemented method for facilitating communications between suppliers and consumers, the method comprising:
   generating a supplier communication Web site comprising a plurality of links to directory Web sites, wherein the supplier communication Web site is accessible over the Internet;
   generating a directory Web site in response to activation of a link to a directory Web site, wherein the directory Web site is associated with a particular class of goods or services and comprises:
      a plurality of links to supplier Web sites;
      a plurality of supplier descriptive portions, wherein each supplier descriptive portion is substantially adjacent a link to a supplier Web site; and
      a supplier communication link;
   generating a communication initiating Web site in response to activation of the supplier communication link, wherein the communication initiating Web site comprises:
      a supplier selector portion that includes a plurality of supplier names and a plurality of selection elements, wherein each selection element is substantially adjacent a supplier name;
      an input portion that includes a plurality of fillable information fields for receiving consumer information data; and
      an activation link;
   receiving consumer information data input into one or more of the plurality of fillable information fields of the communication initiating Web site;
   determining a set of two or more suppliers in response to a consumer's interactions with the communication initiating Web site;
   generating one or more supplier communication messages in response to a consumer's interactions with the communication initiating Web site; and
   delivering via a computer network the one or more supplier communication messages.

9. The method of claim 8, wherein the method further comprises:
   selecting one or more suppliers in response to a consumer's interactions with the directory Web site; and
   generating the plurality of supplier names and the plurality of selection elements included in the supplier selector portion of the communication initiating Web site based on the selection of one or more suppliers.

10. The method of claim 8, wherein the method further comprises:
    receiving an electronic file submitted by a consumer;
    storing the electronic file; and
    delivering via a computer network the electronic file.

11. The method of claim 8, wherein the one or more supplier communication messages comprise consumer information data input into one or more of the plurality of fillable information fields of the communication initiating Web site.

12. The method of claim 8, wherein the directory Web site further comprises a plurality of selection elements, wherein each selection element is substantially adjacent a link to a supplier Web site.

13. The method of claim 8, wherein the directory Web site further comprises a title portion that is descriptive of the particular class of goods or services.

14. The method of claim 8, wherein the method further comprises generating a second directory Web site in response to activation of a link to a second directory Web site, wherein the second directory Web site is associated with a second class of goods or services.

15. A system for facilitating communications between suppliers and consumers, the system comprising:
   a server having non-transitory memory for storing machine instructions that, when executed by at least one processor, are configured to cause the server to:
      generate a supplier communication Web site comprising a plurality of links to directory Web sites;
      generate a directory Web site in response to activation of a link to a directory Web site, wherein the directory Web site is associated with a particular class of goods or services and comprises:
         a plurality of links to supplier Web sites;
         a plurality of supplier descriptive portions, wherein each supplier descriptive portion is substantially adjacent a link to a supplier Web site; and
         a supplier communication link;
      generate a communication initiating Web site in response to activation of the supplier communication link, wherein the communication initiating Web site comprises:
         a supplier selector portion that includes a plurality of supplier names and a plurality of selection elements, wherein each selection element is substantially adjacent a supplier name;
         an input portion that includes a plurality of fillable information fields for receiving consumer information data; and
         an activation link;
      receive consumer information data input into one or more of the plurality of fillable information fields of the communication initiating Web site;
      generate one or more supplier communication messages in response to a consumer's interactions with the communication initiating Web site; and
      deliver via a computer network the one or more supplier communication messages.

16. The system of claim 15, wherein the machine instructions, when executed by at least one processor, are further configured to cause the server to determine a set of two or more suppliers in response to a consumer's interactions with the communication initiating Web site.

17. The system of claim 15, wherein the machine instructions, when executed by at least one processor, are further configured to cause the server to determine a set of two or more suppliers in response to a consumer's interactions with the directory Web site.

18. The system of claim 15, wherein the one or more supplier communication messages comprise consumer information data input into one or more of the plurality of fillable information fields of the communication initiating Web site.

19. The system of claim 15, wherein the machine instructions, when executed by at least one processor, are further configured to cause the server to select one or more suppliers in response to a consumer's interactions with the directory Web site.

20. The system of claim 19, wherein the machine instructions, when executed by at least one processor, are further configured to cause the server to generate the plurality of supplier names and the plurality of selection elements included in the supplier selector portion of the communication initiating Web site based on the selection of one or more suppliers.

\* \* \* \* \*